(12) United States Patent
Vashisht et al.

(10) Patent No.: US 11,856,011 B1
(45) Date of Patent: *Dec. 26, 2023

(54) MULTI-VECTOR MALWARE DETECTION DATA SHARING SYSTEM FOR IMPROVED DETECTION

(71) Applicant: FireEye, Inc., Milpitas, CA (US)

(72) Inventors: Sai Vashisht, Morgan Hill, CA (US); Sumer Deshpande, Milpitas, CA (US); Sushant Paithane, Maharashtra (IN); Rajeev Menon, Fremont, CA (US)

(73) Assignee: Musarubra US LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,091

(22) Filed: Jan. 13, 2023

Related U.S. Application Data

(63) Continuation of application No. 16/353,982, filed on Mar. 14, 2019, now Pat. No. 11,558,401.

(60) Provisional application No. 62/650,946, filed on Mar. 30, 2018.

(51) Int. Cl.
*H04L 9/40* (2022.01)
*G06F 21/56* (2013.01)

(52) U.S. Cl.
CPC .......... *H04L 63/1416* (2013.01); *G06F 21/56* (2013.01); *H04L 63/145* (2013.01); *G06F 21/564* (2013.01)

(58) Field of Classification Search
None
See application file for complete search history.

(56) References Cited

U.S. PATENT DOCUMENTS

| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |

(Continued)

FOREIGN PATENT DOCUMENTS

| GB | 2439806 A | 1/2008 |
| GB | 2490431 B | 3/2014 |

(Continued)

OTHER PUBLICATIONS

U.S. Appl. No. 16/353,982, filed Mar. 14, 2019 Final Office Action dated Oct. 15, 2021.

(Continued)

*Primary Examiner* — Khang Do
(74) *Attorney, Agent, or Firm* — Rutan & Tucker, LLP

(57) ABSTRACT

A computerized method for analyzing an object is disclosed. The computerized method includes obtaining, by a cybersecurity system, an object and context information generated during a first malware analysis of the object conducted prior to obtaining the object. Thereafter, the cybersecurity system performs a second malware analysis of the object to determine a verdict indicating maliciousness of the object. The scrutiny of the second malware analysis is adjusted based, at least in part, the context information, which may include (i) activating additional or different monitors, (ii) adjusting thresholds for determining maliciousness, or (iii) applying a modified rule set during the second malware analysis based on the context information.

19 Claims, 9 Drawing Sheets

(56) References Cited

U.S. PATENT DOCUMENTS

| | | |
|---|---|---|
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,458,452 B1 | 6/2013 | Morgan |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |

(56) References Cited

U.S. PATENT DOCUMENTS

| | | | |
|---|---|---|---|
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 * | 10/2015 | Vincent .................. G06F 21/566 |
| 9,176,843 B1 | 11/2015 | Ismael et al. |
| 9,189,627 B1 * | 11/2015 | Islam .................. H04L 63/1408 |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 * | 4/2016 | Manni .................. G06F 21/554 |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 * | 8/2016 | Khalid .................. H04L 63/1425 |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 * | 10/2016 | Otvagin .................. G06F 16/13 |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 * | 3/2017 | Amin .................. H04L 63/1433 |
| 9,591,020 B1 | 3/2017 | Aziz |
| 9,594,904 B1 * | 3/2017 | Jain .................. G06F 21/563 |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |

(56) References Cited

U.S. PATENT DOCUMENTS

| | | |
|---|---|---|
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,735,468 B1 | 8/2020 | Viljoen |
| 11,558,401 B1 | 1/2023 | Vashisht et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowbur |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0200677 A1 | 9/2006 | Marinescu |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |

(56) References Cited

U.S. PATENT DOCUMENTS

| | | |
|---|---|---|
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0275741 A1 | 11/2007 | Bian et al. |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0249482 A1 | 10/2009 | Sarathy |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Ståhlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |

(56) References Cited

U.S. PATENT DOCUMENTS

| | | |
|---|---|---|
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0266245 A1 | 10/2012 | McDougal et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0232576 A1 | 9/2013 | Karnikis et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0245440 A1* | 8/2014 | Reynolds ............. G06F 21/563 726/23 |
| 2014/0280245 A1 | 9/2014 | Wilson |
| 2014/0282843 A1* | 9/2014 | Buruganahalli .... H04L 63/0428 726/1 |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1* | 4/2015 | Ismael ................. G06F 21/566 726/23 |
| 2015/0180886 A1 | 6/2015 | Staniford et al. |
| 2015/0186645 A1* | 7/2015 | Aziz .................. G06F 9/45558 726/23 |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1* | 8/2015 | Paithane ............. G06F 9/45558 726/23 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0173508 A1 | 6/2016 | Kozlovsky et al. |
| 2016/0188880 A1* | 6/2016 | Smith ................. G06F 21/577 726/23 |
| 2016/0191547 A1 | 6/2016 | Zafar et al. |
| 2016/0191550 A1 | 6/2016 | Ismael et al. |
| 2016/0232352 A1 | 8/2016 | Chen et al. |
| 2016/0232353 A1 | 8/2016 | Gupta et al. |
| 2016/0253498 A1 | 9/2016 | Valencia et al. |
| 2016/0261612 A1 | 9/2016 | Mesdaq et al. |
| 2016/0277272 A1 | 9/2016 | Peach et al. |
| 2016/0285914 A1* | 9/2016 | Singh .................. H04L 63/1416 |
| 2016/0292419 A1 | 10/2016 | Langton et al. |
| 2016/0301703 A1 | 10/2016 | Aziz |
| 2016/0335110 A1 | 11/2016 | Paithane et al. |
| 2016/0337390 A1 | 11/2016 | Sridhara et al. |
| 2017/0013018 A1* | 1/2017 | Nakata ................ H04L 12/6418 |
| 2017/0083703 A1* | 3/2017 | Abbasi ................. G06F 21/561 |
| 2017/0093902 A1 | 3/2017 | Roundy et al. |
| 2017/0098074 A1 | 4/2017 | Okano et al. |
| 2017/0257388 A1 | 9/2017 | Addepalli et al. |
| 2018/0013770 A1 | 1/2018 | Ismael |
| 2018/0033009 A1 | 2/2018 | Goldman et al. |
| 2018/0048660 A1 | 2/2018 | Paithane et al. |
| 2018/0121316 A1 | 5/2018 | Ismael et al. |
| 2018/0191736 A1 | 7/2018 | Cho et al. |
| 2018/0288077 A1 | 10/2018 | Siddiqui et al. |
| 2019/0253435 A1 | 8/2019 | Machlica et al. |
| 2019/0272376 A1* | 9/2019 | Woland ................ G06F 21/567 |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

U.S. Appl. No. 16/353,982, filed Mar. 14, 2019 Non-Final Office Action dated Jun. 24, 2021.
U.S. Appl. No. 16/353,982, filed Mar. 14, 2019 Non-Final Office Action dated Mar. 3, 2022.
U.S. Appl. No. 16/353,982, filed Mar. 14, 2019 Notice of Allowance dated Sep. 1, 2022.
Venezia, Paul , "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.

(56) References Cited

OTHER PUBLICATIONS

Whyte, et al., "Dns-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al., UCSB, Sep. 2007 https://www.cs.ucsb.edu/.about.chris/research/doc/esec07.sub.--mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.sp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", Iin Proceedings of the 12th Annual Network and Distributed System Security, Symposium (NDSS '05), (Feb. 2005).

(56) References Cited

OTHER PUBLICATIONS

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

\* cited by examiner

MULTI-VECTOR MALWARE DETECTION DATA SHARING SYSTEM FOR IMPROVED DETECTION

CROSS REFERENCE TO RELATED APPLICATIONS

This application is a continuation of U.S. patent application Ser. No. 16/353,982, issued as U.S. Pat. No. 11,558,401, which is based upon and claims the benefit of priority from U.S. Provisional Patent Application No. 62/650,946 filed Mar. 30, 2018, the entire contents of both of which are incorporated herein by reference.

FIELD

Embodiments of the disclosure relate to the field of cybersecurity. More specifically, one embodiment of the disclosure relates to a system and method for improved detection of cyberattacks through the sharing of data between cybersecurity systems operating within an enterprise network.

GENERAL BACKGROUND

Network devices provide useful and necessary services that assist individuals in business and in their everyday lives. In recent years, a growing number of cyberattacks are being conducted on all types of network devices. In some cases, these cyberattacks are orchestrated in an attempt to gain access to content stored on one or more network devices (e.g., endpoints, cybersecurity systems, etc.). Such access is for illicit (i.e., unauthorized) purposes, such as spying or other malicious or nefarious activities. For protection, cybersecurity systems may be deployed at a local network or on an endpoint in efforts to detect a cyberattack caused by a malicious object.

Over the years, companies have deployed many different types of cybersecurity systems as part of their network-based, malware protection solution. One type of cybersecurity system includes a network appliance, which performs a two-phase approach for detecting malware contained in network traffic. This two-phase approach includes a static phase and a dynamic phase. During the static phase, network traffic is examined (without execution), for example, for signature-based matches against a library of known malware, and/or for communication-based protocol anomalies or other characteristics upon which a cybersecurity classification may be based. During the dynamic phase, a virtual machine deployed within the cybersecurity system executes objects obtained from the network traffic and monitors the behaviors of each object during execution where information regarding each monitored behavior may also be referred to as an "event" and may be used in cybersecurity classification of the object.

Alternatively, another type of cybersecurity system involves the installation of a cybersecurity agent (hereinafter, "agent") within an endpoint to be protected. For this deployment, the agent is responsible for monitoring and locally storing selected behaviors. Herein, with respect to an endpoint, a behavior includes a task or activity that is conducted by a software component running on the endpoint and, in some situations, the activity may be undesired or unexpected indicating a cyberattack is being attempted, such as a file being written to disk, a process being executed or created, or an attempted network connection.

Currently, cybersecurity detection platforms that deploy a plurality of cybersecurity systems may perform malware detection by analyzing objects according to a particular focus of each cybersecurity system. For example, a first cybersecurity system, operating as a first line of defense, may be an email appliance directed to the analysis of incoming emails and associated objects (i.e., attachments, embedded Uniform Resource Locators "URLs," etc.). Additionally, a second cybersecurity system, operating as a second line of defense, may be an agent running as a daemon process on an endpoint to which an email may be directed, where the agent analyzes the activities resulting from processing of the email by an email application running on the endpoint in real-time. As the first and second cybersecurity systems perform different analyses, each cybersecurity system may include various logic components and apply different rule sets. Thus, analysis of the same object (e.g., the incoming email) by the first and second cybersecurity systems may result in different outcomes, i.e., verdicts of maliciousness, which may be a determination of a classification of malicious, suspicious, benign or indeterminate. Further, the first and second cybersecurity systems typically operate within separate "silos."

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

I. Overview Summary

Figure 1:
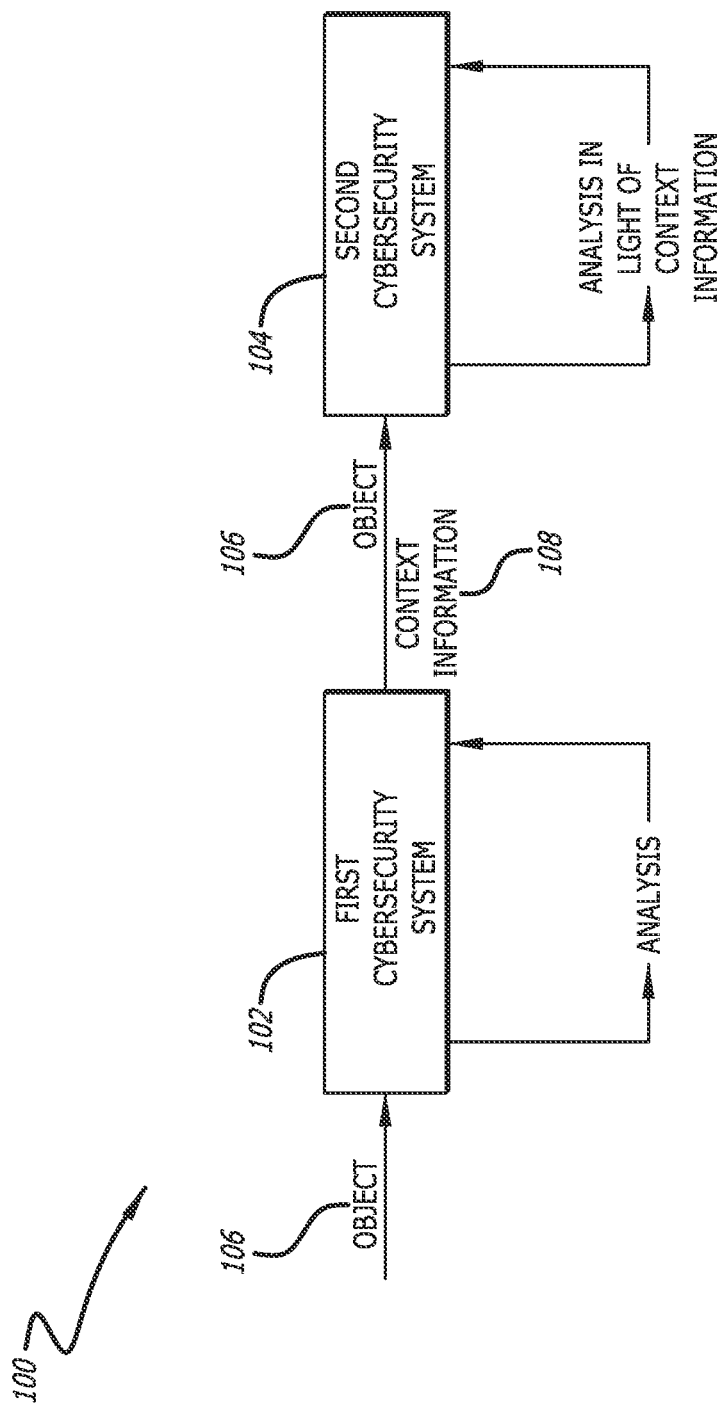
FIG. 1 is an exemplary block diagram of an embodiment of data sharing within a malware analysis data sharing system.

In embodiments of the invention, objects in transit in network traffic or contained in emails may be analyzed by multiple cybersecurity systems as the objects enter and traverse an enterprise network. Contextual data from previously performed analyses are shared among the cybersecurity systems so as to enhance the analysis and classification of the objects in later analyses. Absent such sharing, some analyses may fail to account for the vector, e.g., manner, by which the object entered the network ("the origination of the object") and the results of prior analyses of the object. By sharing the origination of the object and other contextual data of prior analyses, later analyses of the object may more efficiently utilize system resources, and more effectively detect cyberattacks by reducing false negative (FN) and/or false positive (FP) classifications. In addition, by the sharing and reporting of the combined contextual data from among the cybersecurity systems, these embodiments can provide more information regarding attack life cycles, including the kill chain of cyberattacks so as to enhance remediation efforts.

In general, one embodiment of the disclosure relates to a malware analysis data sharing system that is designed to facilitate the sharing of contextual data between a first cybersecurity system and a second cybersecurity system in order to improve malware analyses performed by the second cybersecurity system. For this embodiment of the disclosure, the malware analysis data sharing system includes a plurality of cybersecurity systems (e.g., cybersecurity appliances and/or agents) deployed within or coupled to an enterprise network. Each cybersecurity system is configured to conduct analyses of objects to determine whether any of the objects may be associated with malware.

As described below, according to one embodiment of the disclosure, a first cybersecurity system performs a first malware analysis on the object and generates contextual data (generally referred to as "context information") following, or concurrent with, the analysis. Herein, the term "concurrent" means at least partially overlapping in time. The "context information" may refer to information detailing the performance of a malware analysis, which may include a result of the analysis, often referred to as a score or verdict, one or more identifiers (e.g., hashes) of analyzed objects, identifiers of processes running objects of interest, one or more rules implicated during the analysis, and/or origination information of the one or more analyzed objects. Herein, this context information may be provided in different formats such as the actual contextual data, a representation of the actual contextual data as a plurality of bits or pointers each representing a portion of the context information in lieu of the actual contextual data itself, or a combination thereof.

In one embodiment, upon completing the first malware analysis, the first cybersecurity system modifies the object to include a representation of the context information. The modification of the object with a representation of the context information facilitates and automates the sharing of the context information with a second cybersecurity system. Herein, modification of an object to include a representation of the context information may be referred to as "active sharing." For example, the first cybersecurity system may modify the header of an email object to include the context information. In particular, the first cybersecurity system may perform a first malware analysis that differs from a second malware analysis performed by the second cybersecurity system. In one embodiment, the first cybersecurity system may be a network appliance that performs an analysis of objects received via email including emails, attachments, embedded objects, URLs, etc., while the second cybersecurity system may be a software agent processing on an endpoint within the enterprise network configured to monitor activities at the endpoint. As the analyses performed by the first and second cybersecurity systems may differ in rules or logic applied as well as behaviors monitored, the cybersecurity systems may not gather the same information during their analyses.

Therefore, by providing context information associated with its malware analysis, the first cybersecurity system can greatly improve and assist with the malware analysis performed by the second cybersecurity system. Specifically, the second cybersecurity system, e.g., an agent installed on an endpoint, may improve its analysis by either (i) determining the origination of the object, and prioritizing the analysis of the object to increase the scrutiny of the analysis, such as by activating certain monitors, adjusting thresholds for determining maliciousness, applying a modified rule set during its analysis for example, or (ii) maintaining a more detailed event log and performing a more detailed preliminary detection, if the agent is so-equipped. In particular, one or more thresholds may be used by the cybersecurity systems to determine levels of maliciousness (e.g., suspicious or malicious) based on comparing scores associated with the activities, behaviors or characteristics observed and other context information, and may be modified based on the context information. The logic components of the agent that assist in and perform the prioritizing are discussed in further detail with respect to FIG. 9.

In some embodiments, cybersecurity systems implemented as appliances (such as those directed to analyzing network traffic or email traffic) may perform an analysis including (i) static and/or dynamic analyses, as described above, (ii) monitoring for selected events or combinations of events conducted by the object (or the application in which the object is processed, and/or the virtual machine during such processing), (iii) detecting occurrences of any of these monitored events or combinations of events, and (iv) classifying the observed events with respect to maliciousness. In some embodiments, a network appliance monitors traffic entering and, sometimes, exiting, a trusted area of a protected network (e.g., at least a portion of an enterprise network), and, thus is disposed to monitor the traffic at the periphery of the network. Additionally, in some embodiments, an email appliance is situated behind the exchange server and configured to monitor email traffic entering, and at times, exiting the network. The logic components of the appliances that assist in and perform the prioritizing are discussed in further detail with respect to FIG. 8.

The cybersecurity systems may also perform a correlation or classification phase based on its own malware analysis and, in the case of the second cybersecurity system, the context information provided by the first cybersecurity system, to determine whether the object is malicious, benign or indeterminate (i.e., neither malicious nor benign), which may be represented by a score. Additionally, the second cybersecurity system may generate and issue a report, directly or indirectly via another cybersecurity system, to one or more endpoints, an administrator of the enterprise network and/or a cybersecurity specialist such that the report is based on its malware analysis, and optionally, the context information provided by the first cybersecurity system.

The malware analysis data sharing system may also facilitate a remediation process when an object is determined to be malicious. Based on the context information, the second cybersecurity system, or another logic component within the enterprise system, may determine the origination of a malicious object and employ retroactive detection logic to facilitate remediation of any infected devices (e.g., endpoints and/or network appliances). The retroactive detection logic may utilize the context information to trace the path through which the malicious object traveled within the enterprise network. By determining the path through which the malicious object traveled, the retroactive detection logic can initiate remediation efforts on any affected network device (e.g., quarantine the device on the network and/or the object within the device). In addition, the retroactive detection logic may flag any rules during past analyses that failed to lead to classifying the object as malicious and transmit the flagged rule(s), directly or indirectly, to an administrator and/or cybersecurity specialist for review and/or updating to improve efficacy in future detections by the updated rule set. Alternatively, this can be performed automatically. Additionally, in some embodiments when an agent determines an email object is malicious, the agent may prevent the user from opening an attachment or activating a URL, if applicable. Similarly, when a network cybersecurity system determines an outbound network request or an inbound response is associated with malware or a cyberattack, the network cybersecurity system can prevent the network request from being transmitted and/or prevent the inbound response from reaching the corresponding endpoint. Further, any cybersecurity system may, upon determining an object is malicious, transmit a notification to a threat management system, which notifies other cybersecurity systems and endpoints that received the same object, e.g., an email.

Additionally, in some embodiments, the first cybersecurity system may provide the context information based on the analysis of one or more objects to a non-transitory storage location communicatively coupled to the enterprise network, often referred to as a "cybersecurity intelligence hub." Additionally, the context information may be provided to a management system, e.g., a logic component generally configured to correlate data received from multiple cybersecurity systems. Receipt of context information from multiple cybersecurity systems enables the management system to (i) determine whether the same malware appears to be present at different cybersecurity systems (i.e., evidence of a malware attack) and (ii) consolidate at least a portion of the data in order to provide a holistic view of the malware attack. One embodiment of a management system is described in more detail in U.S. Pat. No. 9,311,479, titled, "Correlation and Consolidation of Analytic Data For Holistic View of A Malware Attack" by Manni et al., filed Apr. 12, 2016, the entire contents of which are hereby incorporated by reference.

In some embodiments in which the context information is provided to a cybersecurity intelligence hub (described below), the first cybersecurity system may provide the one or more analyzed objects to the second cybersecurity system without the context information. The second cybersecurity system may then retrieve the context information from the cybersecurity intelligence hub and perform its malware analysis in accordance with the context information. Herein, the use of the cybersecurity intelligence hub for storage and retrieval of context information may be referred to as "passive sharing." Further, in some embodiments, a combination of active sharing and passive sharing are utilized to share context information generated by a first cybersecurity system with a second cybersecurity system.

In some embodiments, as will be discussed in detail below, a first cybersecurity system performs a first malware analysis on one or more objects of an incoming message, e.g., an email, and generates first context information that is provided, via active or passive sharing, to a second cybersecurity system, and optionally, a cybersecurity intelligence hub. The cybersecurity intelligence hub is configured to perform monitoring on a global scale, while reducing the overall network throughput requirements and mitigating repetitive analytics on identical objects. This allows for better platform scalability without adversely affecting the currency or relevancy of stored metadata within the cybersecurity intelligence hub. Hence, the cybersecurity intelligence hub may operate as (i) a central facility connected via a network to receive context information from the cybersecurity systems; (ii) an intelligence analytics resource to analyze the received context information, including results from an analysis of context information or object received from disparate sources, and store the analysis results with (or cross-referenced with) the received context information; and/or (iii) a central facility serving as a distribution hub connected via a network to distribute the stored context information to the consumers.

The second cybersecurity system then performs a second malware analysis, in some embodiments, at least in part in accordance with the first context information, and generates a second context information corresponding to the second malware analysis. The second context information may then be provided, via active or passive sharing, to the cybersecurity intelligence hub and a third cybersecurity system, which may perform a third malware analysis in accordance with at least the second context information such as analyzing context information of an outgoing message, e.g., outbound network request, and updating the header of the outgoing message to reflect both its origination and any an operation that triggered the outgoing message. In one embodiment, the third cybersecurity system may also retrieve the first context information from the cybersecurity intelligence hub and perform the third malware analysis in light of both the first and second context information.

It should also be noted that, although the examples discussed herein relate to receipt of an email object, a network request and, in some instances, an inbound response, other object types may be analyzed in a similar manner by one or more of the cybersecurity systems disclosed herein. For example, a cybersecurity system may be deployed as an agent on an endpoint to analyze an object stored on a removable storage device, such as for example a USB device. The agent may utilize the origination of the object to determine a specific rule set for analysis of the object, and remediation, if necessary. For example, if the object retrieved from a USB device launches a script, such activity may be deemed at least suspicious based on the object's origination.

II. Terminology

In the following description, certain terminology is used to describe various features of the invention. For example, each of the terms "logic," "engine," and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

Herein, a "communication" generally refers to related data that is received, transmitted, or exchanged within a communication session. The data may include a plurality of packets, where a "packet" broadly refers to a series of bits or bytes having a prescribed format. Alternatively, the data may include a collection of data that may take the form of an individual or a number of packets carrying related payloads, e.g., a single webpage received over a network.

The term "computerized" generally represents that any corresponding operations are conducted by hardware in combination with software and/or firmware.

The term "agent" generally refers to a module of software installed on a target system (e.g., an endpoint, or other network device) that monitors processing activities and interacts with the target system. Agents gather information about multiple aspects of the target system. Additionally, agents, in some embodiments and responsive to the activities in accordance to monitoring rules followed by the agent, store the monitored activities as events in an event log and permit remote retrieval, on a push or pull basis, of the contents of the event log. The agent may be configured to either communicate (via the endpoint in which it is installed) over a computer network, or to read and write all relevant configuration information and acquired data to a computer storage medium, such as a hard drive or removable read/write media (USB drive, etc.). In one embodiment, the agent is built in a modular fashion. The ability to gather a particular piece of data from a target system (e.g. a list of running processes on the target system or a log file or timeline) is implemented as separate modules of software and loaded by the agent. This allows for easy adaptation of the agent to different environments that have specific requirements for data collection.

According to one embodiment of the disclosure, the term "malware" may be broadly construed as any code, communication or activity that initiates or furthers a cyberattack. Malware may prompt or cause unauthorized, anomalous, unintended and/or unwanted behaviors, or in some situations, more specifically, operations. constituting a security compromise of information infrastructure (herein, the term "operation" may be considered one example of a behavior). For instance, malware may correspond to a type of malicious computer code that, as an illustrative example, executes an exploit to take advantage of a vulnerability in a network, network device or software, for example, to gain unauthorized access, harm or co-opt operation of a network device or misappropriate, modify or delete data. Alternatively, as another illustrative example, malware may correspond to information (e.g., executable code, script(s), data, command(s), etc.) that is designed to cause a network device to experience anomalous (unexpected or undesirable) behaviors. The anomalous behaviors may include a communication-based anomaly or an execution-based anomaly, which, for example, could (1) alter the functionality of a network device executing application software in an atypical manner; (2) alter the functionality of the network device executing that application software without any malicious intent; and/or (3) provide unwanted functionality which may be generally acceptable in another context.

The term "object" generally relates to content (or a reference to access such content) having a logical structure or organization that enables it to be classified for purposes of analysis for malware. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data. Additionally, the term object may refer to an instance of an executable that is executing ("a process"). In one embodiment, an object may be a URL or list of URLs. The object may be retrieved from information in transit (e.g., one or more packets, one or more flows each being a plurality of related packets, etc.) or information at rest (e.g., data bytes from a storage medium).

The term "network device" may be construed as any electronic computing system with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, an endpoint (e.g., a laptop, a mobile phone, a tablet, a computer, etc.), a standalone appliance, a server, a router or other intermediary communication device, a firewall, etc. For convenience, and by way of illustration, the description that follows will often describe the agent and its operation in terms of being located on an endpoint rather than the more general case of a network device. Moreover, the description may describe communication as being between an agent and one or more external devices or components thereof though it will be understood that such communication is effected via the network device in which the agent is installed.

The term "rules" generally refers to software or data that is used in detection of malware or cyberattacks. According to one embodiment of the disclosure, each rule is configured to specify a conditional logic statement or programmatic entity used in a cybersecurity system during operation in detecting and classifying cyberattacks. Rules may be received and maintained by the cybersecurity system in files, libraries, directories, or other modular programmatic structures, or may be integrated into logic running within the cybersecurity systems for example such as in their operating software. Importantly, in embodiments of the invention, the cybersecurity rules may be individually modified or a set of rules may be selected and/or modified (changed, added, subtracted, etc.) for use in the cybersecurity engine during runtime to adjust operability of the cyber-security system and influence cybersecurity verdicts.

For instance, rules may be logic for use in detecting a cyberattack, each capable of being represented as a logical expression for example, an "if this, then that" conditional statement where "this" represents a condition and "that" represents the conclusion (e.g., malicious or not malicious, etc.). A condition may encompass, for example, a signature, heuristic, pattern, string or value. The conclusion is applied when the condition is met, for example, by one or more observed characteristics, behaviors or activities. For convenience in terminology, each rule may also represent only the "if this" portion of the conditional statement, with the balance of the logical expression ("then that"), implemented by the operating software of the cybersecurity engine that consumes the rule. Hence, the term "implicated rules," as used herein, refers to the one or more specific rules applied in reaching a verdict, reflecting observed characteristics, behaviors and activities and the conclusions drawn from them based on the logical expressions.

As another illustrative example, a rule may provide configuration information containing parameter values for configuring the operating software of the cybersecurity system, such as, for example, threshold values used in detection (e.g., specifying the threshold for suspiciousness and maliciousness). Different types of analyses may be configured to utilize different types of rules. For instance, signature-based rules are used in determining whether a hash (or other signature of an event) matches a stored library of signatures (e.g., exploit, vulnerability or fingerprint-type signatures). Likewise, protocol anomaly rules determine whether an event matches a stored library of protocol-specific requirements and/or anomalies (e.g., communication header anomalies with respect to HTTP) while execution anomaly rules determine whether, during execution of an object, observed activities and behaviors are expected or anomalous. Classification rules determine verdicts, for example, based on weightings or scores for observed characteristics, activities and behaviors. In addition, cybersecurity rules sets include prioritization rule sets and remediation rule sets, as described below.

Herein, rules may be stored in a rules store (e.g., a repository) in persistent memory of a cybersecurity system and are typically updated frequently (periodically or aperiodically) in light of the prevailing threat landscape. The rule updates may be distributed to the cybersecurity systems in security content files or libraries, originating from, for example, a manufacturer or other source charged with assuring the security content used by the cybersecurity systems are current. Such rule updates are in contrast to rule set selection (where plural alternative rule sets may be maintained by the cybersecurity system), or rule modification by the cybersecurity system, based on the contextual information of a prior analysis, as described herein with regard to embodiments of the invention.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring to FIG. 1, an exemplary block diagram of an embodiment of data sharing within a malware analysis data sharing system is shown. Herein, the malware analysis data sharing system 100 includes a first cybersecurity system 102 communicatively coupled to a second cybersecurity system 104. The first cybersecurity system 102 is shown to receive the object 106, e.g., via an origination vector such as, for example, email. The first cybersecurity system 102 performs a first malware analysis and generates context information 108 based on the first malware analysis. As discussed above, the context information 108 may be information detailing the performance of the first malware analysis and include a verdict of the analysis (suspicious, malicious, benign or indeterminate), an identifier (e.g., hash) of the analyzed object (object 106), one or more rules implicated during the analysis, and origination information (i.e., information indicating the vector by which the analyzed object 106 into the enterprise network as represented by determined categories (e.g., email, network traffic such as webpage traffic, removable storage device such as a USB device, etc.)). Additionally, when the object 106 includes additional objects, attached to or embedded in the object 106, the context information 108 may include hashes of the additional objects, rules implicated in analysis thereof, and a verdict of the analysis of each of the additional objects.

According to FIG. 1, the second cybersecurity system 104 receives the object 106 and the context information 108. In this embodiment, the first cybersecurity system 102 provides the context information 108 to the first cybersecurity system 104 via active sharing. As discussed above, active sharing refers to the modification of the object 106 to include the context information 108. For instance, in a first embodiment in which the object 106 is an email and the first cybersecurity system 102 is an email appliance located at a periphery of a network, the first cybersecurity system 102 may modify the object 106 to include a "X-header" that stores a plurality of bits representing the context information 108. A X-header may generally be understood as an additional header of an email added during transmission, which contains customizable information. However, in a second embodiment in which the object 106 is a webpage and the first cybersecurity system 102 is a network appliance, the first cybersecurity system 102 may modify the object 106 to include HTTP header information representing the context information 108.

Further, upon receiving the modified object 106 with the context information 108, the second cybersecurity system 104 performs a second malware analysis on the object 106 in light of the context information 108. As will be described in detail below, the second cybersecurity system 104 may determine the origination of the object 106 from the context information 108. As one example, in an embodiment in which the object 106 is an email object received by an email cybersecurity appliance monitoring emails entering the network, the origination refers to "email".

Based on the origination of the object 106, and optionally other information included in the context information 108, the second cybersecurity system 104 may prioritize, e.g., modify or tailor, its malware analysis of the object 106. For example, the second cybersecurity system 104 may typically employ logic that utilizes a set of predetermined rules (or models, as discussed below) in its malware analysis and/or classification phase. However, based on the origination of the object 106, the second cybersecurity system 104 may employ the logic utilizing a modified set of rules (or models). Therefore, the second cybersecurity system 104 may utilize the context information 108 to tailor a malware analysis and/or classification phase to the object 106, taking into account the origination of the object 106 and one or more rules (or models) implicated in the malware analysis performed by the first cybersecurity system 102 (i.e., rules triggered during analysis that factored in the determination of the verdict). Specifically, the tailored malware analysis and classification phase leads to fewer false positives and false negatives, thereby providing an improved malware detection process.

As a useful construct, the rules used in the cybersecurity system 102 and 104 may be categorized as follows: (1) detection rules, (2) correlation rules, and (3) remediation rules. Detection rules are used to determine whether an alert or other report of one or more cybersecurity events should be generated and issued when the condition or conditions within a rule matches observed characteristics, activities, and behaviors. One example of detection rules differentiates between normal internet activities and malicious activities indicative of an intrusion into a protected network. Information regarding these activities, when detected, constitute events stored in an event log, and it is these events to which the rules are applied. Hence, the detection rules generally "model" the many events that cybersecurity systems may capture. Correlation rules are used to compare one or more events (e.g., patterns or sequences) with patterns of known malicious or non-malicious activities to classify the observed activities, e.g., as malicious, benign, or indeterminate, and thus ascertain whether a cyberattack occurred or is occurring. Remediation rules are used to determine what remedial measures, if any, should be activated to prevent, block or mitigate a cyberattack, which measures may automatically be deployed or and which only upon approval from a network or security administrator.

Figure 8:
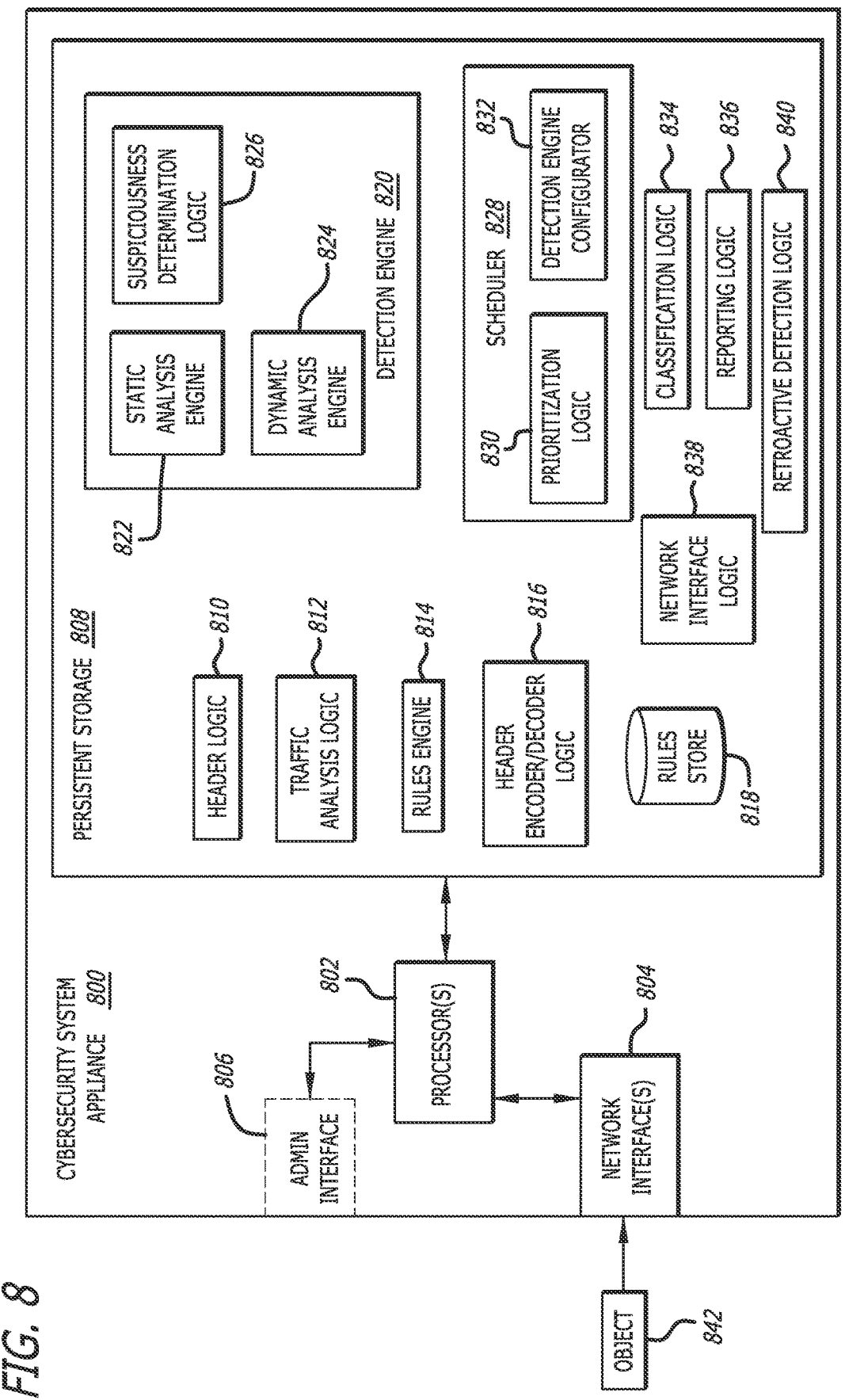
FIG. 8 is an exemplary embodiment of a logical representation of an appliance cybersecurity system.

For example, one or more of the cybersecurity systems 102 and 104 (e.g., cybersecurity system 102) may be deployed as an appliance that is communicatively coupled to receive and analyze incoming messages. As an appliance, the cybersecurity system 102 includes logic being physical components that analyze incoming message for malware, such as a processor and memory including one or more virtual machines, software (e.g., OS(es), application(s), plug-in(s), etc.) to instantiate each of the virtual machines, and monitoring logic to monitor for certain behaviors conducted by an object running in a virtual machine (VM). FIG. 8 provides additional detail with respect to the appliance architecture and logic components stored thereon.

Figure 9:
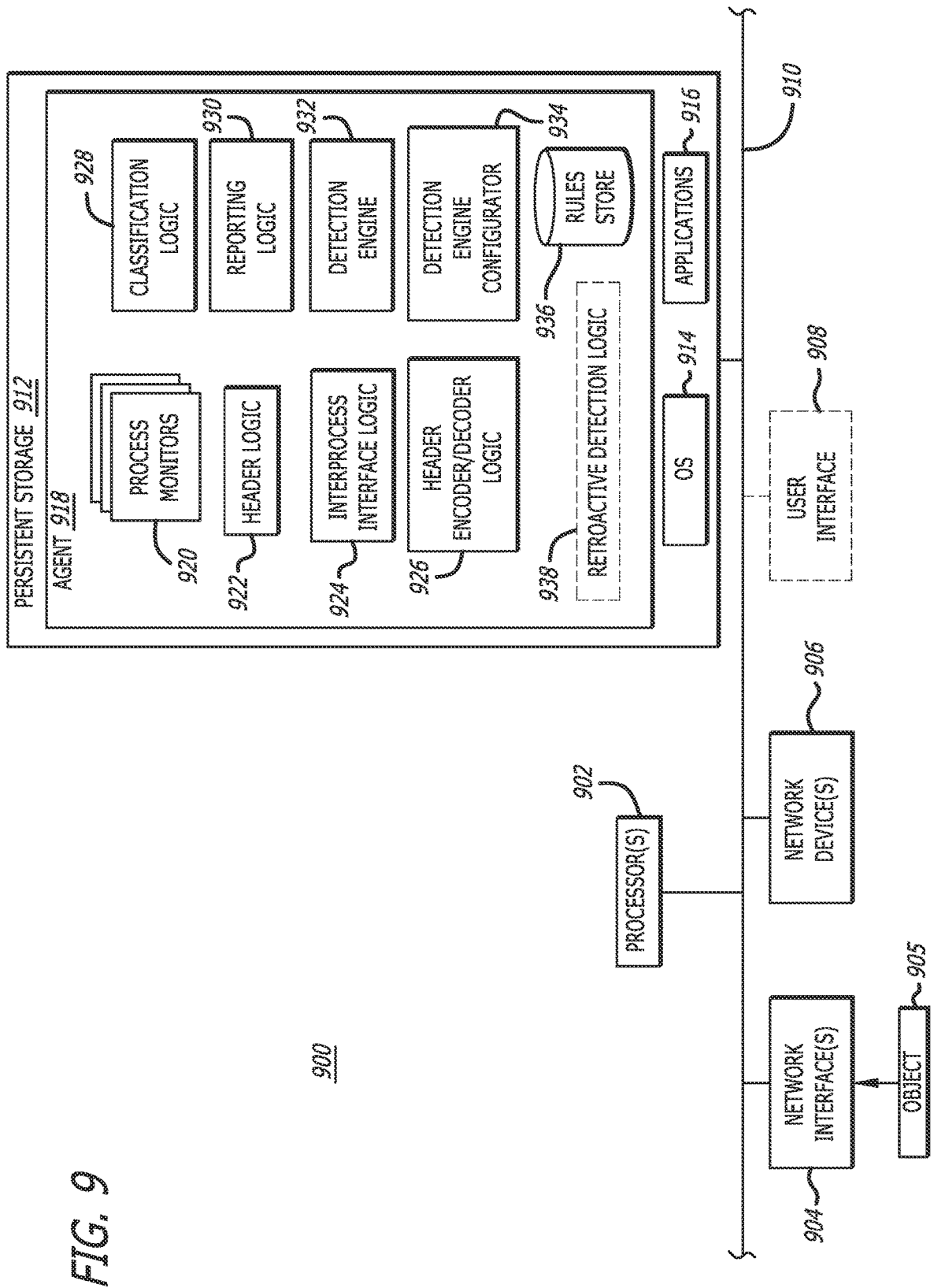
FIG. 9 is an exemplary embodiment of a logical representation of an endpoint including an agent cybersecurity system.

Further, one or more of the cybersecurity systems 102 and 104 (e.g., cybersecurity system 104), may be deployed as a virtual device, namely a software (daemon) agent to detect cyberattacks, which may operate in the foreground (or background as the daemon) of a network device (e.g., an endpoint). An agent cybersecurity system installed on an endpoint may monitor activities processing on the endpoint looking for indicators of compromise (IoCs), which may be discovered by the agent cybersecurity system during monitoring of operations performed by the endpoint. FIG. 9 provides additional detail with respect to the agent architecture and associated logic components.

Each of the cybersecurity systems 102 and 104 (e.g., cybersecurity system 102) may be deployed on-premises (e.g., as an edge network device for the local network, as a network device within the local network, etc.) to detect and analyze incoming objects propagating into or through the local network for malware, etc., or deployed proximate to an exchange server to monitor email traffic attempting to enter the local network or being sent to a protected network device. Alternatively, although not shown, each of the cybersecurity systems 102 and 104 may be deployed as a cloud-based solution in which the incoming objects (or a representation thereof) are captured at the local network and submitted to at least one of the cloud-based cybersecurity systems 102 and 104 (e.g., or a copy of the incoming objects may be submitted). Additionally, at least one of the cybersecurity systems 102 and 104 (e.g., cybersecurity system 104) may be deployed at an endpoint as a software agent operating in the background to analyze and monitor for certain behaviors by the object.

It is contemplated that, although described within or coupled to an enterprise network deployment, the cybersecurity systems 102 and 104 may be deployed as systems within a public or private cloud service or systems deployed and communicatively coupled over a public network (e.g., internet). In such systems, customers may subscribe to cybersecurity services, and pay according to the services received. In such cloud-based deployments, based on the context information 108 from the first cybersecurity system 102 (e.g., origination), the second cybersecurity system 104 may modify its malware analysis to accommodate different quality of service (QoS) levels based on subscription tier or other subscription-related factors associated with the customer of a cybersecurity service, the service being provided, at least in part, by the first cybersecurity system 102. For instance, the second cybersecurity system 104 may support a different (quicker) response time or a different set of predetermined rules in its malware analysis (i.e., more comprehensive analysis) based on the context information 108 provided and based as well on the subscription factors for the customer involved (e.g., the customer to whom the email or webpage, as the case may be, was directed). The rules may be modified, e.g., customized, pursuant to a request by or in light of the threat landscape confronting the customer. In addition, one or more thresholds used by the cybersecurity systems to determine levels of maliciousness (e.g., suspicious or malicious) based on comparing scores associated with the behaviors and characteristics observed and other context information, may be modified on a per-customer basis.

IV. System Architecture

Figure 2:
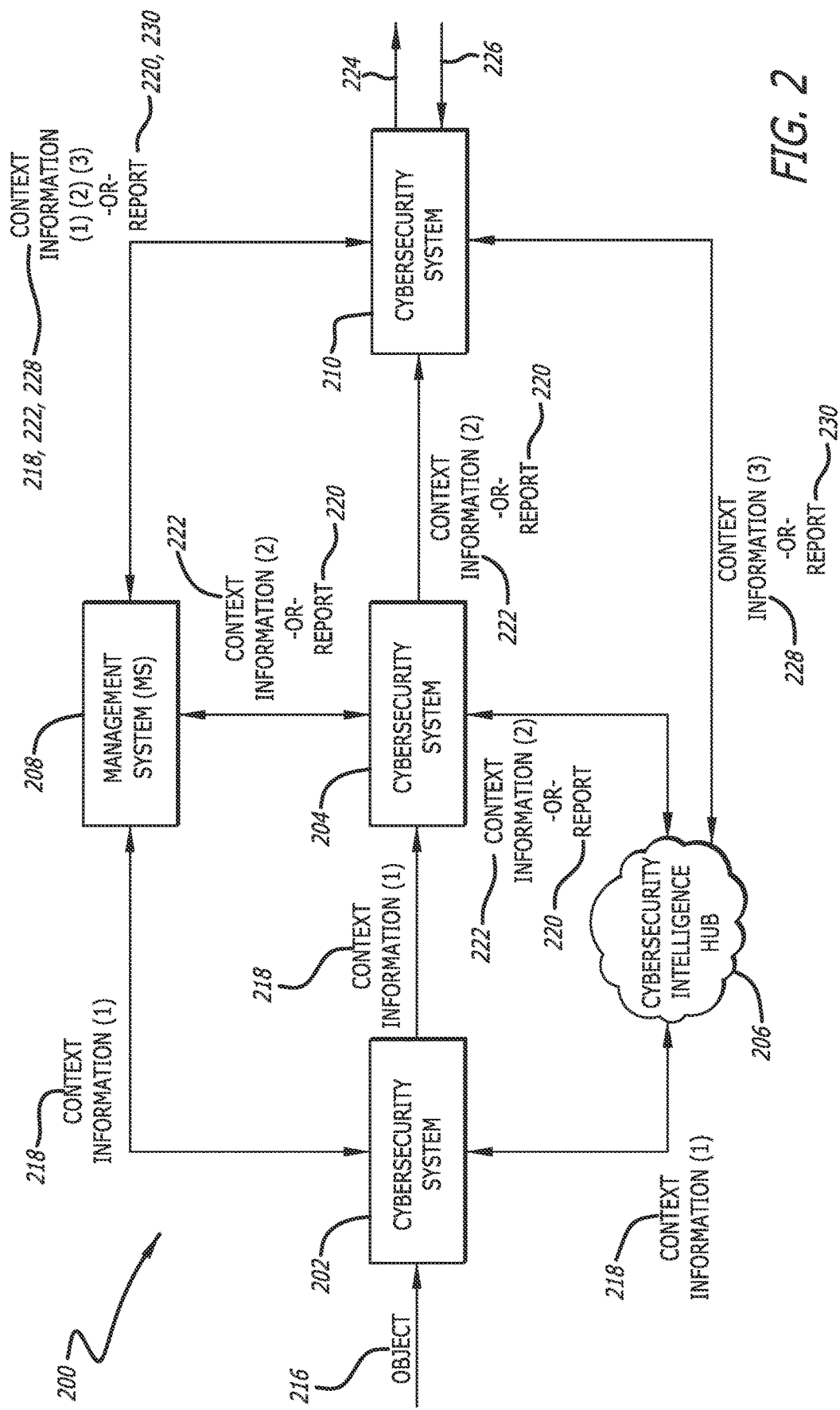
FIG. 2 is an exemplary block diagram of an embodiment of data sharing within a malware analysis data sharing system including a management system.

Referring now to FIG. 2, an exemplary block diagram of an embodiment of data sharing within a malware analysis data sharing system including a management system is shown. The malware analysis data sharing system 200, deployed within an enterprise network, includes or is coupled to, a first cybersecurity system 202, a second cybersecurity system 204, a management system (MS) 208 and a third cybersecurity system 210. Additionally, a cybersecurity intelligence hub 206 is communicatively coupled to the malware analysis data sharing system 200.

As is seen in the illustration of FIG. 2, the first cybersecurity system 202 receives an object 216. For the purposes of this embodiment, the receipt of the object 216 by the first cybersecurity system 202 will be referred to as the point at which the object 216 entered the enterprise network. Upon receipt of the object 216, the first cybersecurity system 202 performs a malware analysis on the object 216. As discussed above, the malware analysis may include a static and/or dynamic analysis, monitoring of processing of the object 216 and detection of malicious or nefarious behaviors that indicate the object 216 is likely associated with malware. In addition to performing a first malware analysis, the first cybersecurity system 202 generates first context information 218. The first context information 218 may include, but is not limited or restricted to, the type of malware analysis performed, a verdict determined as a result of the first malware analysis, one or more rules implicated during the first malware analysis, characteristics and behaviors observed through static and dynamic analyses, origination information, and/or an identifier (e.g., a hash value) of the object 216. Additionally, the first context information 218 may include any additional objects attached to or embedded in the object 216, as well as rules implicated in analysis of the additional objects, and/or a verdict of the analysis of each of the additional objects.

The first cybersecurity system 202 determines a verdict as a result of the first malware analysis (suspicious, malicious, benign or indeterminate) or a score reflecting the maliciousness of the object. When the first malware analysis results in a verdict of maliciousness (or a score exceeding a predetermined threshold), the first cybersecurity system 202 may generate and issue a report to the management system 208 and/or the second and third cybersecurity systems 204 and 210. The report may include a visual representation of the first context information 218 (e.g., one or more display screens, printed report, etc.).

When the first malware analysis results in a verdict other than malicious (suspicious, benign or indeterminate) or the score does not exceed a predetermined threshold, the first cybersecurity system 202 provides at least the first context information 218 to the second cybersecurity system 204 through either active sharing and/or passive sharing, as will be discussed below. Additionally, the first cybersecurity system 202 may optionally provide the context information to the management system 208 for aggregation and correlation with context information 218 or other data received from other cybersecurity systems. Although not illustrated in FIG. 2, the first cybersecurity system 202 may transmit the object 216 to the second cybersecurity system 204 or another network device. As an illustrative example, where the first cybersecurity system 202 is an email appliance, it may be deployed in-line and block malicious emails. The emails that are suspicious, indeterminate or benign, may continue to an exchange server which transmits the emails to the endpoint destination which may have an endpoint agent.

1 Active Sharing

In one embodiment, the first cybersecurity system 202 may actively share the first context information 218 with the second cybersecurity system 204. For example, the active sharing may include modification of the object 216 to include at least a representation of the first context information 218. In some embodiments, the object 216 may be modified by altering the header of the object 216 to include the first context information 218, represented by a vector comprising a plurality of bits for example. The plurality of bits may enable the second cybersecurity system 204 to determine the content of the context information 218. As discussed above, altering of the header of the object 216 may include the addition of a X-header where the object is an email. However, modification of the object 216 to include the context information 218 is not limited to addition of a X-header or even generally modification of the header of the object 216. The disclosure contemplates that active sharing should be broadly construed as any modification of the object 216 to include the context information 218.

Additionally, as referenced above, the context information 218, or a representation thereof such as a plurality of bits, may be encoded when provided to the second cybersecurity system 204. The encoding of the context information provides resource-saving advantages by compressing the data and also obscures the information so as not to be easily intercepted by malware, malware writers and/or alternative cybersecurity systems. Malware may use the header information to evade detection.

Upon modifying the object 216 to include the first context information 218, the first cybersecurity system 202 transmits the modified object 216 to the second cybersecurity system 204. Thus, by receiving the modified object 216, the second cybersecurity system 204 receives the first context information 218.

2. Passive Sharing

As an alternative, or in addition, to active sharing, the second cybersecurity system 204 may obtain the first context information 218 via passive sharing techniques. In one embodiment, the first cybersecurity system 202 may passively share the first context information 218 with the second cybersecurity system 204 by uploading the first context information 218 to the cybersecurity intelligence hub 206 and transmitting the object 216, in an unmodified state, to the second cybersecurity system 204. The second cybersecurity system 204 may then retrieve the first context information 218 from the cybersecurity intelligence hub 206. In one specific embodiment, the second cybersecurity system 204 may compute a hash of the object 216 and query the cybersecurity intelligence hub 206 for context information that includes the hash of the object 216 or may be referenced by content within the hash of the object 216. Additionally, the query to the cybersecurity intelligence hub 206 may include an identifier of the first cybersecurity system 202. The context information 216 may be stored in the cybersecurity intelligence hub 206 with the identifier indicating that the context information 216 was uploaded by the first cybersecurity system 202. In some cases, the header is only modified to provide information serving as an index into entries in the cybersecurity intelligence hub 206 where the context information 216 can be located.

In yet some embodiments, the object 216 and the first context information 218 may be uploaded to the cybersecurity intelligence hub 206 and a communication message transmitted to the second cybersecurity system 204 indicating that the object 216 and the context information 218 are available on the cybersecurity intelligence hub 206 for retrieval by the second cybersecurity system 204.

Although not illustrated, the malware analysis data sharing system 200 may include, or have access to, a rule (or model) database configured to store rules (or models) used in the malware analyses applied by the cybersecurity systems within the malware analysis data sharing system 200, e.g., the cybersecurity systems 202, 204 and/or 210. Each of the cybersecurity systems 202, 204 and/or 210 may be communicatively coupled to the database. In particular, the context information shared between cybersecurity systems, e.g., the context information 218, may include one or more rules, models, or a representation thereof, implicated during the malware analysis corresponding to the context information. Thus, the cybersecurity system that receives the context information, e.g., the second cybersecurity system 204 receiving the first context information 218, may query the database to determine the rules (or models) represented by the representation of the implicated rules within the context information 128. Although FIG. 2 illustrates that the object 216 is received by the first cybersecurity system 202, the object 216 may be received by an endpoint, for example when the first cybersecurity system 202 is deployed out-of-band.

3. Origination Determination

Upon obtaining the context information 218, the second cybersecurity system 204 performs one or more operations to determine the origination of the object 216, e.g., the vector by which the object 216 entered the enterprise network, which, in this embodiment, is via the first cybersecurity system 202. Determination of the origination of the object 216 is advantageous for the second cybersecurity system 204 as the origination may be used to prioritize or adjust analysis of the object 216 performed by the second cybersecurity system 204.

A. Prioritization

A cybersecurity system may prioritize its analysis of an object by modifying its analysis to utilize an amended rule set, activate certain monitors of a cybersecurity system, and analyze the object according to the prioritized analysis based at least in part on received context information. In one embodiment, the prioritization of the analysis of an object may be determined, at least in part, by object type and origination according to a set of predetermined prioritization rules. The prioritization rules, which may be stored in a rules store, or stored with or communicatively coupled to the cybersecurity system, may set forth logic (e.g., a decision tree) that indicates the modified rule set to be used in analysis of the object 216 based on object type and origination (other factors may be considered as well, such as the verdict or score determined by the first cybersecurity system 202 and/or one or more rules implicated during the first malware analysis). In order to determine the origination of the object 216, the second cybersecurity system 204 parses the context information 218, which includes origination information of the object 216 and associated objects analyzed by the first cybersecurity system 202 along with a hash of each object. Upon determining the origination information, the second cybersecurity system 204 may prioritize the malware analysis of the object 216 as discussed above. Additionally, in some embodiments, the second cybersecurity system 204 may cause a query, which includes a hash of the object, to be transmitted to the cybersecurity intelligence hub 206, which may correlate the hash with stored hashes in order to rapidly reach a conclusion as to whether the object is known malware based on prior analyses and stored verdicts.

More specifically, the second cybersecurity system 204 may modify its monitoring and malware analysis of the object 216 based on the origination of the object 216. For example, assuming the object 216 includes an attached, embedded, or linked PDF object, the second cybersecurity system 204 may typically perform a malware analysis that includes applying a first predetermined rule set to detected behaviors, during or subsequent to, monitoring the processing of PDF objects; however, the origination of the object 216 may indicate that a second predetermined rule set (or second model) is to be used. For example, based on the origination of the object 216, a more stringent rule set (or model) may be applied during the monitoring and analysis of the object 216 than would otherwise be applied. Specific examples are provided below with respect to FIG. 4.

Upon performing a modified monitoring and malware analysis, the second cybersecurity system 204 may perform a classification phase in which the results of the analysis are utilized by the network cybersecurity system to classify the network request (e.g., suspicious, malicious, benign, or indeterminate). The second cybersecurity system 204 may also prioritize its classification phase by modifying classification or correlation rules used, altering predetermined thresholds for determining maliciousness, altering weights associated with monitored activities, etc.

Further, upon performing a modified monitoring and malware analysis, the second cybersecurity system 204 generates second context information 222. Similar to the first context information 218, the second context information 222 may include origination information of each object analyzed by the second cybersecurity system 204, any verdict, any rules implicated during analysis, and a hash of each object analyzed. It should be noted that the second cybersecurity system 204 does not alter the origination information (e.g., the origination information is passed along from the first cybersecurity system 202 to the second cybersecurity system 204 and to the third cybersecurity system 210). The second context information 222 may also provide the verdict determined by the first cybersecurity system 202, one or more rules implicated by the malware analysis of the first cybersecurity system 202 as well as the verdict determined by the second cybersecurity system 204 and one or more rules implicated by the malware analysis of the second cybersecurity system 204.

As is illustrated in FIG. 2, the second context information 222 may be provided to one or more of the cybersecurity intelligence hub 206, the management system 208 and/or a third cybersecurity system 210.

4. Report Generation

Upon completion of the second malware analysis, a reporting logic of the second cybersecurity system 204, i.e., the reporting logic 836 of FIG. 8 or the reporting logic 930 of FIG. 9, may generate and issue (or cause the endpoint on which it is installed or cause a security information and event management system ("STEM") or endpoint threat management system with which it communicates to issue) a report 220, which may include a visual representation of the context information 222. The report 220 may include the context information 222 including any verdict, and the report 220 may also be sent to a third cybersecurity system 210 (e.g., a network cybersecurity system as discussed in FIG. 4). The management system 208, which may include a threat management system, may provide (e.g., display) the report to a network or security administrator. Further, the second cybersecurity system 204 may additionally provide the report 220 to the cybersecurity intelligence hub 206. In addition, the second context information 222 may be provided separately or in addition to the report 220. As discussed as an illustrative example with respect to FIG. 4 below, the third cybersecurity system 210 may utilize the second context information 222 in its own malware analysis after obtaining the second context information 222 via active or passive sharing of an outbound network request 224 initiated during processing of the object 216 on the second cybersecurity system 204 and, optionally, an inbound response 226, when applicable. Additionally, based on its analysis, the third cybersecurity system 210 may generate context information 228 and/or a report 230 that may be provided to the cybersecurity intelligence hub 206 and/or the management system 208.

IV. General Operations

Figure 3:
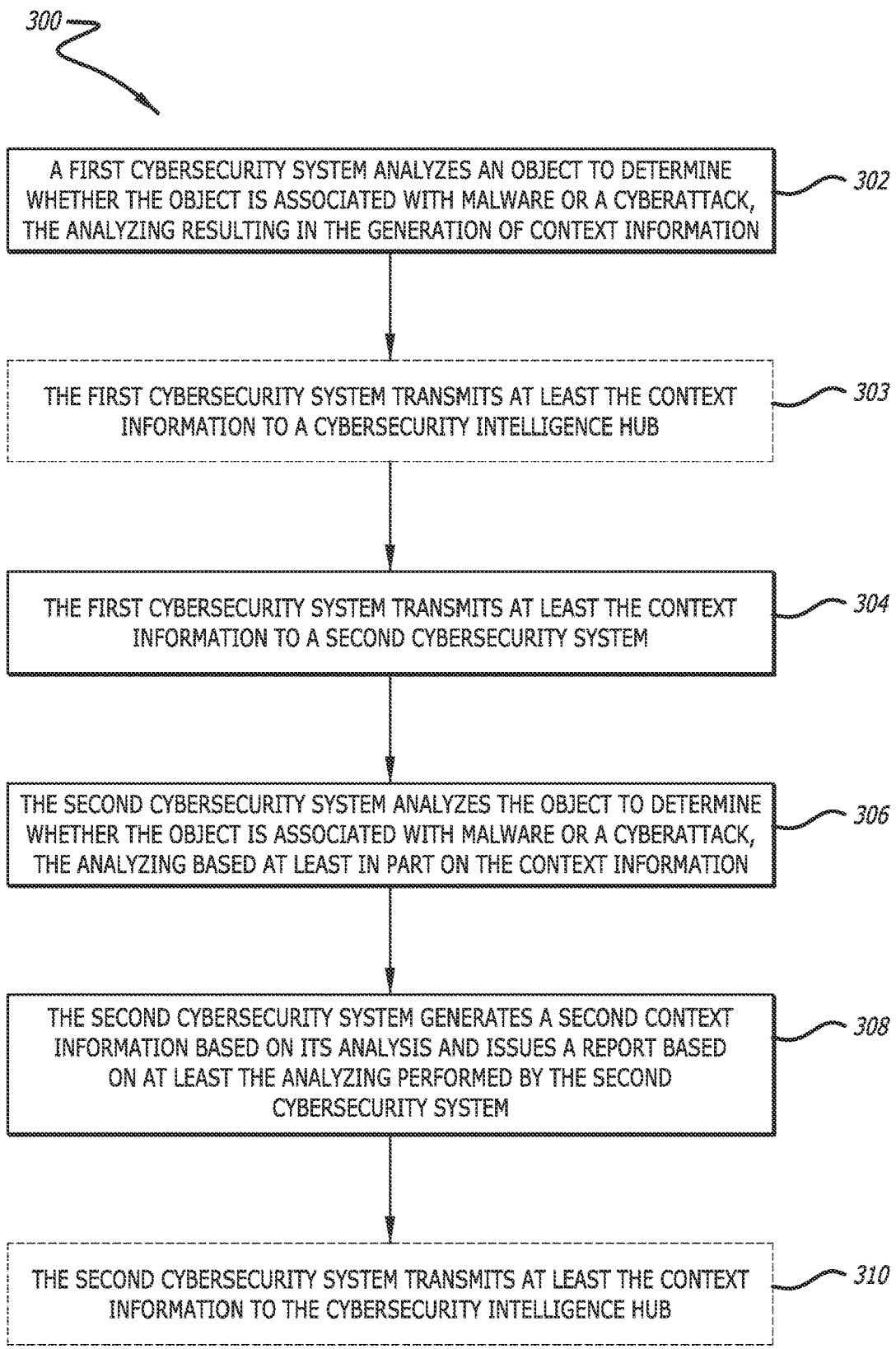
FIG. 3 is a flowchart illustrating an exemplary method of sharing context information generated during malware analysis between cybersecurity systems of a malware analysis data sharing system operating within an enterprise network.

Referring to FIG. 3, a flowchart illustrating an exemplary method of sharing context information generated during malware analysis between cybersecurity systems of a malware analysis data sharing system operating within an enterprise network is shown. Each block illustrated in FIG. 3 represents an operation performed in the method 300 of sharing context information generated during malware analysis between cybersecurity systems operating within an enterprise network. Herein, the method 300 begins when a first cybersecurity system receives and analyzes an object to determine whether the object is associated with malware or a cyberattack (block 302). Specifically, the malware analysis performed by the first cybersecurity system results in the generation of context information. Optionally, the first cybersecurity system may transmit at least the context information to a cybersecurity intelligence hub, or a management system (block 303).

Upon completing its malware analysis, the first cybersecurity system provides at least the context information to a second cybersecurity system (block 304). As discussed above, providing the context information may be via active sharing by modifying the object under analysis to include the context information. However, in other embodiments, the first cybersecurity system need not provide the context information via active sharing but may instead provide the context information to a cybersecurity intelligence hub for retrieval by the second cybersecurity system.

Referring still to FIG. 3, upon obtaining the object and the context information generated by the first cybersecurity system, the second cybersecurity system analyzes the object using a second malware analysis differing from that of the first cybersecurity system to determine whether the object is associated with malware or a cyberattack (block 306). Importantly, the second malware analysis is performed based at least in part on the context information generated by the first cybersecurity system. Additionally, the second malware analysis may be different than the first malware analysis.

Following the second malware analysis, the second cybersecurity system generates second context information and, optionally, issues a report based on the second malware analysis, which may include the second context information (block 308). The generation of the report is based indirectly, and may optionally be based directly, on the first context information generated by the first cybersecurity system as well as the second context information. Optionally, the second cybersecurity system may transmit at least the second context information to the cybersecurity intelligence hub, or to the management system (block 310).

IV. Exemplary System Architecture

Figure 4:
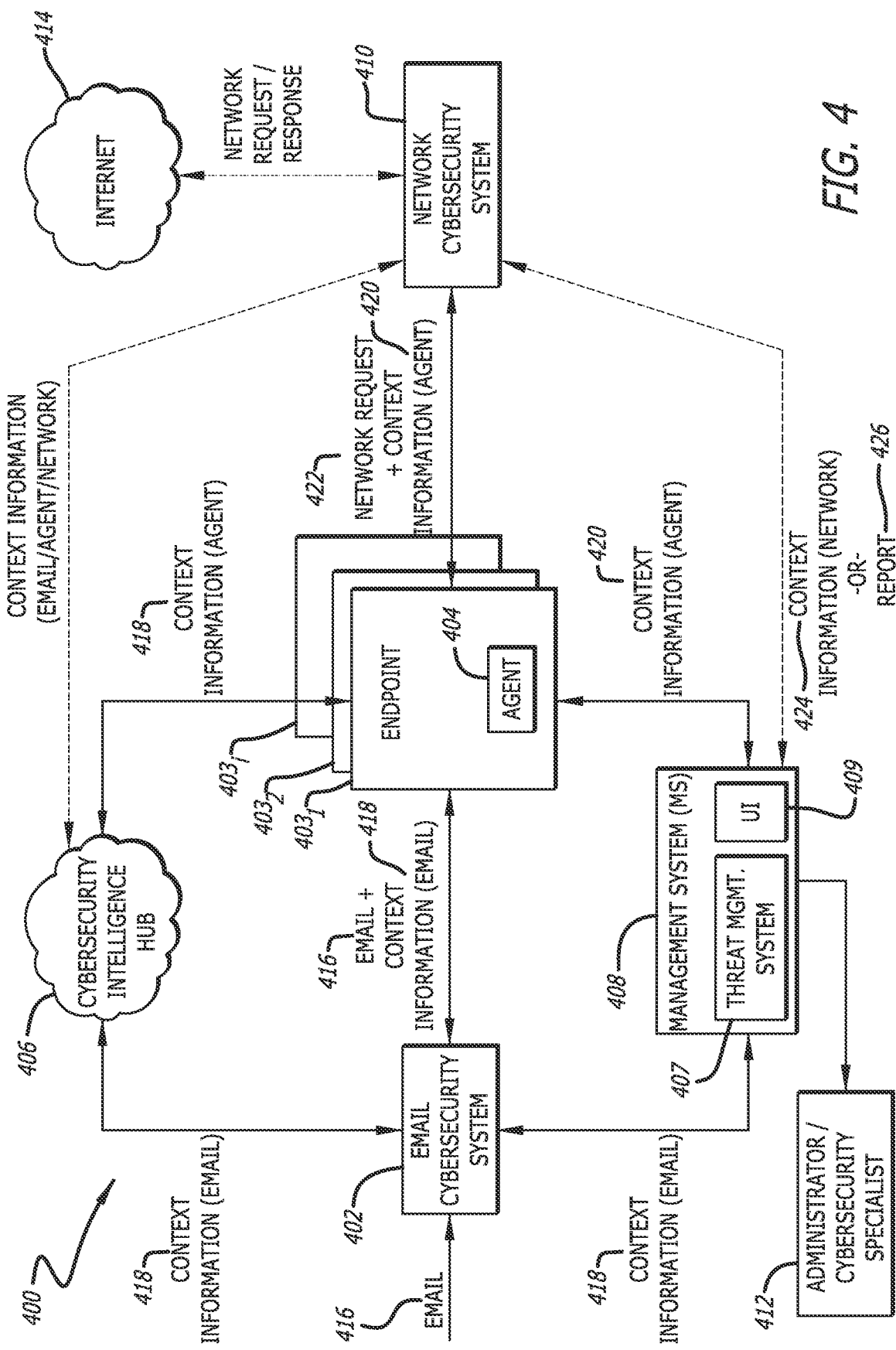
FIG. 4 is a second, detailed exemplary block diagram of an embodiment of data sharing within a malware analysis data sharing system including a management system.

Referring now to FIG. 4, a second, detailed exemplary block diagram of an embodiment of data sharing within a malware analysis data sharing system 400 including a management system is shown. The malware analysis data sharing system 400 includes an email cybersecurity system 402, a second cybersecurity system 404, i.e., an endpoint agent ("agent"), operating on an endpoint $403_1$ of the endpoints $403_1$-$403_i$ (wherein i≥1), a management system (MS) 408 and a network cybersecurity system 410. Additionally, one or more of the components of the malware analysis data sharing system 400 may be communicatively coupled to one or more networks, e.g., a cybersecurity intelligence hub 406, the internet 414. For purposes of clarity, FIG. 4 illustrates the network cybersecurity system 410 is communicatively coupled to the internet 414; however, it should be understood that the email cybersecurity system 402 and the endpoint $403_1$ may also be communicatively coupled thereto.

In one embodiment, the email cybersecurity system 402 may include logic that analyzes electronic messages, e.g., emails, transmitted to and from the malware analysis data sharing system 400 to identify malicious content within emails. Analysis of an email may include a two-phase approach for detecting malware, i.e., a static phase and a dynamic phase. During the static phases, the email is inspected for protocol anomalies and other characteristics indicative of a cyberattack. During the dynamic phase, a virtual machine deployed within the cybersecurity system executes objects obtained from the network traffic being analyzed and monitors the behaviors of each object during execution.

As mentioned above, the endpoint 404 may include a cybersecurity system, namely an agent 404 operating as a daemon process on the endpoint $403_1$. The agent 404 monitors, captures, and, in some embodiments, analyzes the processing performed on the endpoint $403_1$ in real-time to identify indicators of compromise of the endpoint $403_1$ (that is, processing activity potentially indicative of a cyberattack).

In one embodiment, the endpoint $403_1$ on which the agent 404 is installed communicates over a network, which may be in common with other endpoints $403_2$-$403_i$, with a STEM or other threat management system. The threat management system 407, may be included in the management system 408, and may be one dedicated to managing threats at endpoints $403_1$-$403_i$, depending on the embodiment. The threat management system 407 in the endpoint-dedicated embodiment serves to aggregate the events, context information and, if made available, any verdicts reached by the supported endpoints $403_1$-$403_i$, perform cyberattack detection (or validation, depending on whether the agents installed on each endpoint include cyberattack detection), and correlation across supported endpoints and classification, based on the provided information, issue alerts via a user interface, and, in some embodiments, initiate remedial action on the affected endpoints or issue recommended remedial action.

Further, the network cybersecurity system 410 may operate to intercept outbound network traffic including network requests to download webpages from a remote server over a public network (e.g., the internet), and analyze the intercepted traffic to determine whether the traffic is likely associated with malware, as well as in-bound responses to the requests including any of the webpages. Embodiments of the network cybersecurity system 410 may utilize a two-phase approach as discussed above. In particular, the email cybersecurity system 402, the agent 404 (operating on an endpoint) and the network cybersecurity system 410 may each apply different predetermined rule sets to their analyses. For example, the email cybersecurity system 402 may apply email-centric rules, such as rules directed to the analysis of attachments, hot-linked content, and embedded objects such as URLs for example, which may be more aggressive, e.g., stringent, in providing higher scores of maliciousness for URLs in or attachments to emails than other cybersecurity systems, e.g., network cybersecurity systems, due to the high number of malware attacks stemming from emails. Differently, network cybersecurity systems may apply rules associated with webpages as well as attachments and embedded or hyperlinked files such as WORD® documents or PDFs and hot-linked content. Further, agents may apply rules related to monitoring of typical applications running on the endpoint as well as executables including known malware to detect indicators of compromise, e.g., processing activities.

As is seen in the illustration of FIG. 4, the email cybersecurity system 402 receives an object 416, e.g., an email object. Performing malware analysis on emails is a high priority for enterprise networks as malicious network content is often distributed by electronic messages, including email, using such protocols as POP (Post Office Protocol), SMTP (Simple Message Transfer Protocol), IMAP (Internet Message Access Protocol), and various forms of web-based email. Malicious content may be directly attached to the email (for example as a document capable of exploiting a document reading application, such as a malicious Microsoft® Excel® document). Alternatively, emails may contain URL links to malicious content hosted on web servers elsewhere on the network, that when activated, may result in the download of infectious content.

Upon receipt of the email 416, the email cybersecurity system 402 performs a malware analysis on the email 416. In addition to performing a first malware analysis, the email cybersecurity system 402 generates email context information 418. The email context information 418 may include, but is not limited or restricted to, the type of malware analysis performed, a verdict determined as a result of the first malware analysis, one or more rules implicated during the first malware analysis, origination information, a hash of the email 416 and any additional objects attached to or embedded in the email 416, as well as rules implicated in analysis of the additional objects, and a verdict of the analysis of each of the additional objects.

The email cybersecurity system 402 determines a verdict as a result of the first malware analysis (suspicious, malicious, benign or indeterminate) or a score reflecting maliciousness. When the first malware analysis results in a verdict of malicious or a score above a predetermined threshold, the email cybersecurity system 402 may generate and issue a report (not shown) to the management system 408 and one or more other components of, or communicatively coupled to, the malware analysis data sharing system 400. The report may include a visual representation of the email context information 418.

When the first malware analysis results in a verdict other than malicious (suspicious, benign or indeterminate) or a score less than the predetermined threshold, the email cybersecurity system 402 provides the email context information 418 to the endpoint $403_1$ through either active sharing and/or passive sharing as discussed above. Additionally, the email cybersecurity system 402 may optionally provide the context information 408 to the cybersecurity intelligence hub 406 and/or the management system 408 for correlation with context information or other data received from cybersecurity systems. In some embodiments, the management system 408 may relay the email 416 and the context information 418 to the endpoint $403_1$.

In one embodiment as illustrated in FIG. 4, the email cybersecurity system 402 actively shares the email context information 418 with the endpoint $403_1$ through modification of the email 416 by the email cybersecurity system 402. For example, the email cybersecurity system 402 may add a X-header to the email 416 such that the X-header includes at least the email context information 418. The email context information may be a representation of an encoded plurality of bits utilized by the agent 404 to determine the content of the context information 418. Upon modifying the email 416 to include the email context information 418, the email cybersecurity system 402 transmits the modified email 416 to endpoint $403_1$. Thus, by receiving the modified email 416, the endpoint $403_1$ receives the email context information 418.

Alternatively, or in addition to active sharing, the endpoint $403_1$ may obtain the email context information 418 via passive sharing techniques. For example, the email cybersecurity system 402 may passively share the email context information 418 with the endpoint $403_1$ by uploading the email context information 418 to the cybersecurity intelligence hub 406 and transmitting the email 416, in an unmodified state, to the endpoint $403_1$. The agent 404 may then cause the endpoint $403_1$ to retrieve the email context information 418 from the cybersecurity intelligence hub 406. As discussed above, in one specific embodiment, the agent 404 may compute a hash of the email 416 and query the cybersecurity intelligence hub 406 for context information associated with the hash of the email 416. Additionally, the query to the cybersecurity intelligence hub 406 may include an identifier of the email cybersecurity system 402, which may be used by the cybersecurity intelligence hub 406 to provide the applicable context information as referenced above.

Upon obtaining the context information 418, the agent 404 performs one or more operations to determine the origination of the email 416, which may include parsing the context information 418 for an indicator of the origination (e.g., email, other network traffic, removable storage via an endpoint, etc.). As stated above, in the embodiment illustrated in FIG. 4, the origination is shown as being by email via the email cybersecurity system 402. As mentioned above, the logic components of the agent 404 that cause performance of operations associated with the monitoring and analyzing of activities on an endpoint are illustrated in FIG. 9.

Specifically, due to the vast number of processes and objects for a cybersecurity system to analyze, in-depth analysis of every process and object is not typically viable as discussed above. In the embodiment illustrated in FIG. 4, the agent 404, which monitors and analyzes the processing on an endpoint in real-time, improves its malware analysis by prioritizing the analysis of objects and processes operating on the endpoint by modifying the analysis of a particular object based on, at least in part, the context information associated with the object. For clarity, on an endpoint, the objects and processes are run under user control, so the agent does not prioritize the processing of either, but prioritizes what the agent monitors and the types of analysis of observed indicators of compromise (i.e., tailors its monitoring, analysis and/or classification of the object). By tailoring the monitoring, analysis and/or object classification, the malware analysis may be improved by reducing occurrences of false positives and false negatives while avoiding degradation in performance of the endpoint.

Determining the origination of the email 416 may enable the agent 404 to prioritize the analysis of the processes and objects associated with the email 416. For example, processes initiated by an object associated with an email (e.g., an attachment) may receive a more scrutinized monitoring and result in, based on predetermined rules or a configuration of the agent 404 and responsive to the origination and other context information, a "suspicious" verdict for the email, a higher level of suspiciousness than processes initiated by other objects, or even a malicious verdict. Therefore, by determining which objects and processes originated via email (e.g., those associated with the email 416), the agent 404 is able to prioritize, e.g., tailor, the monitoring of processing activities of these objects and processes. As discussed above, the agent 404 may determine the origination from the context information 418.

As discussed above, prioritizing the analysis and/or monitoring of objects and processes based on origination information may result in a modification of one or more rule sets used in a malware analysis of the email 416, associated objects and corresponding processes to tailor the malware analysis thereof based on the origination. For example, assuming the email 416 includes a PDF object as an attachment, the agent 404 may typically perform a malware analysis that includes applying a first predetermined rule set (or model) to detected behaviors while monitoring the processing of PDF objects; however, the origination of the PDF attachment being via email may indicate that a second predetermined rule set is to be used, e.g., a more stringent rule set may be applied during the monitoring of the PDF attachment than would otherwise be applied.

Upon performing a modified malware analysis, the agent 404 generates second context information 420. Similar to the email context information 418, the second context information may include origination information of each object analyzed by the agent 404 along with a hash of each object analyzed as well as other information as described above. The second context information 420 may also provide the verdict determined by the agent 404, one or more rules implicated by the malware analysis of the agent 404 as well as the verdict determined by the email cybersecurity system 402 and one or more rules implicated by the malware analysis of the email cybersecurity system 402.

As is illustrated in FIG. 4, the second context information 420 may be provided to one or more of the cybersecurity intelligence hub 406, the management system 408, the network cybersecurity system 410. Optionally, the second context information 420 may be accessible by an administrator/cybersecurity specialist 412 (via the management system 408, and in particular, the user interface (UI) logic 409). In the embodiment illustrated in FIG. 4 within the malware analysis data sharing system 400, the malware analysis of the email 416, and associated objects and processes, continues as an outbound network request 422 is generated, i.e., as a result of processing the email 416 and associated objects. In one example, the outbound network request 422 may seek to download a webpage from a remote server, e.g., over a public network such as the internet. The remote server may be legitimate or a malicious server.

In response to the generation of the network request 422, in one embodiment wherein active sharing is implemented, a header logic of the agent 404, i.e., the header logic 922 as illustrated in FIG. 9, modifies the network request 422 to include at least the second context information 420 (e.g., encoded bit representation of certain contextual data) prior to transmission of the network request 422 to the network cybersecurity system 410. Similar to the modification of the email 416 by the email cybersecurity system 402, the agent 404 may modify the network request 422 by modifying a HTTP header or, more generally, adding information to the network request 422, for example, by adding an additional network header, that includes at least the representation of the context information 420. Following the modification of the network request 422, the modified network request 422 is transmitted to the network cybersecurity system 410. As an alternative to actively sharing the context information 420 via modification of the network request 422, the agent 404 may passively share the context information 420 by uploading, via the endpoint $403_1$, the context information 420 to the cybersecurity intelligence hub 406 as discussed above.

Upon receiving the modified network request 422, the network cybersecurity system 410 may determine the origination of the network request 422 based on the context information 420. The determination of the origination of the network request 422 may be done in a similar manner as discussed above with respect to the determination of the origination of the email 416 by the agent 404. For example, the network cybersecurity system 410 may parse the context information 420 included in the network request 422 for the origination information included therein. In this embodiment, the context information 420 may indicate that the network request 422 was generated as a result of processing of either the email 416, or an associated object, that entered the enterprise network via email. Thus, the network cybersecurity system 410 may prioritize the analysis, e.g., a third malware analysis, of the network request 422 accordingly, such as applying a modified rule set during analysis. As further illustrated in FIG. 4, the network cybersecurity system 410 may query the cybersecurity intelligence hub 406 for the email context information 418 for additional context information of prior analysis not included in the second context information 420.

Additionally, in some embodiments, the inbound response may include identifying information enabling the network cybersecurity system 410 to pair the inbound response with the outbound network request 422, and, thus utilize at least the context information 420 in analyzing the inbound response. Subsequent to, or concurrent with, the third malware analysis, as well as the analysis of the inbound response, the network cybersecurity system 410 may generate third context information 424 based on the third malware analysis and the analysis of the inbound response, if applicable.

Upon completion of the third malware analysis, the network cybersecurity system 410 may generate and issue a report 426 to one or more of the endpoint $403_1$. Additionally, the network cybersecurity system 410 may provide the report 426 and/or the third context information 424 to the cybersecurity intelligence hub 406 and/or the management system 408 (which may provide the report 426 and the third context information 424 to the administrator/cybersecurity specialist 412). It should also be noted that, although not shown, reports may be generated by the email cybersecurity system 402 and/or the agent 404. Such reports may be uploaded to the cybersecurity intelligence hub 406 and/or the management system 408 for storage.

When the third malware analysis results in a verdict indicating the network request 420 is associated with malware or a cyberattack, the network cybersecurity system 410 may facilitate a remediation process. In one embodiment, the network cybersecurity system 410 may include a retroactive detection logic discussed above. Alternatively, the network cybersecurity system 410 may provide the third context information 424 to the management system 408 and/or directly or indirectly to the agent 404, either of which may include a retroactive detection logic and facilitates remediation of any affected devices by tracing the path through which the email 416 or its associated objects traveled within the enterprise network and causing other endpoints along that path (and other endpoints to whom the email may have been forwarded) to block the opening and processing of the email and attachments thereto (if any) and further forwarding of the email by an email application. Operations of the retroactive detection logic are discussed above.

Figure 5:
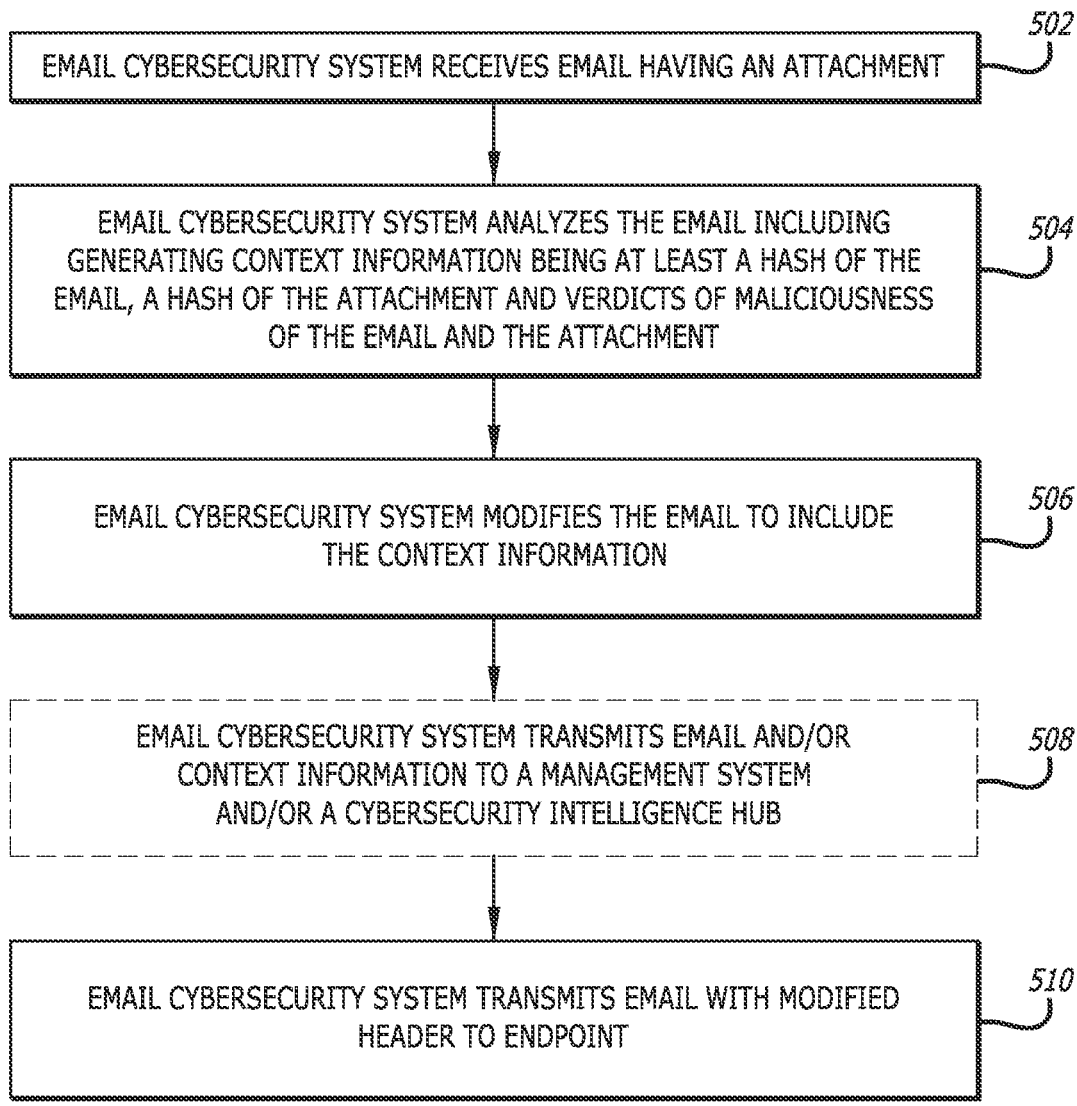
FIG. 5 is a flowchart illustrating a method of generating context information by an email cybersecurity system and actively sharing the context information to a second cybersecurity system within an enterprise network.

Referring now to FIG. 5, a flowchart illustrating a method of generating context information by an email cybersecurity system and actively sharing the context information to a second cybersecurity system within an enterprise network is shown. Each block illustrated in FIG. 5 represents an operation performed in the method 500 of generating context information by an email cybersecurity system and actively sharing the context information. The method 500 begins when an email cybersecurity system receives an email object, e.g., an email communication (block 502). Additionally, the email object may include one or more attachments or embedded URLs. For the purpose of this example, the email will be discussed as having one attachment.

The email cybersecurity system analyzes the email object and the attached object, e.g., via static and/or dynamic analyses. Prior to, following, or concurrent with, the analyses, the email cybersecurity system generates context information including at least a hash of the email object, a hash of the attachment and embedded URLs, and a verdict of the analyses (block 504). However, as discussed above, the context information may include additional information. Following the generation of the context information, the email cybersecurity system modifies the email to include the context information (block 506). In one embodiment, the email cybersecurity system modifies the header of the email object by adding a X-header to the email header with the X-header containing the context information.

As an optional operation performed in the method 500, the email cybersecurity system may transmit the email and/or the context information to a management system and/or a cybersecurity intelligence hub (block 508). The transmission of the context information to the cybersecurity intelligence hub enables the passive sharing of the context information between the email cybersecurity system and the other cybersecurity systems within the enterprise network.

Upon modifying the email object to include the context information, the email cybersecurity system transmits the modified email to the endpoint on which an agent cybersecurity system is installed (block 510). As discussed above, the agent cybersecurity system, in response to a particular activity such as an attempt to open the email, performs a malware analysis based at least in part on the context information provided by the email cybersecurity system.

Figure 6:
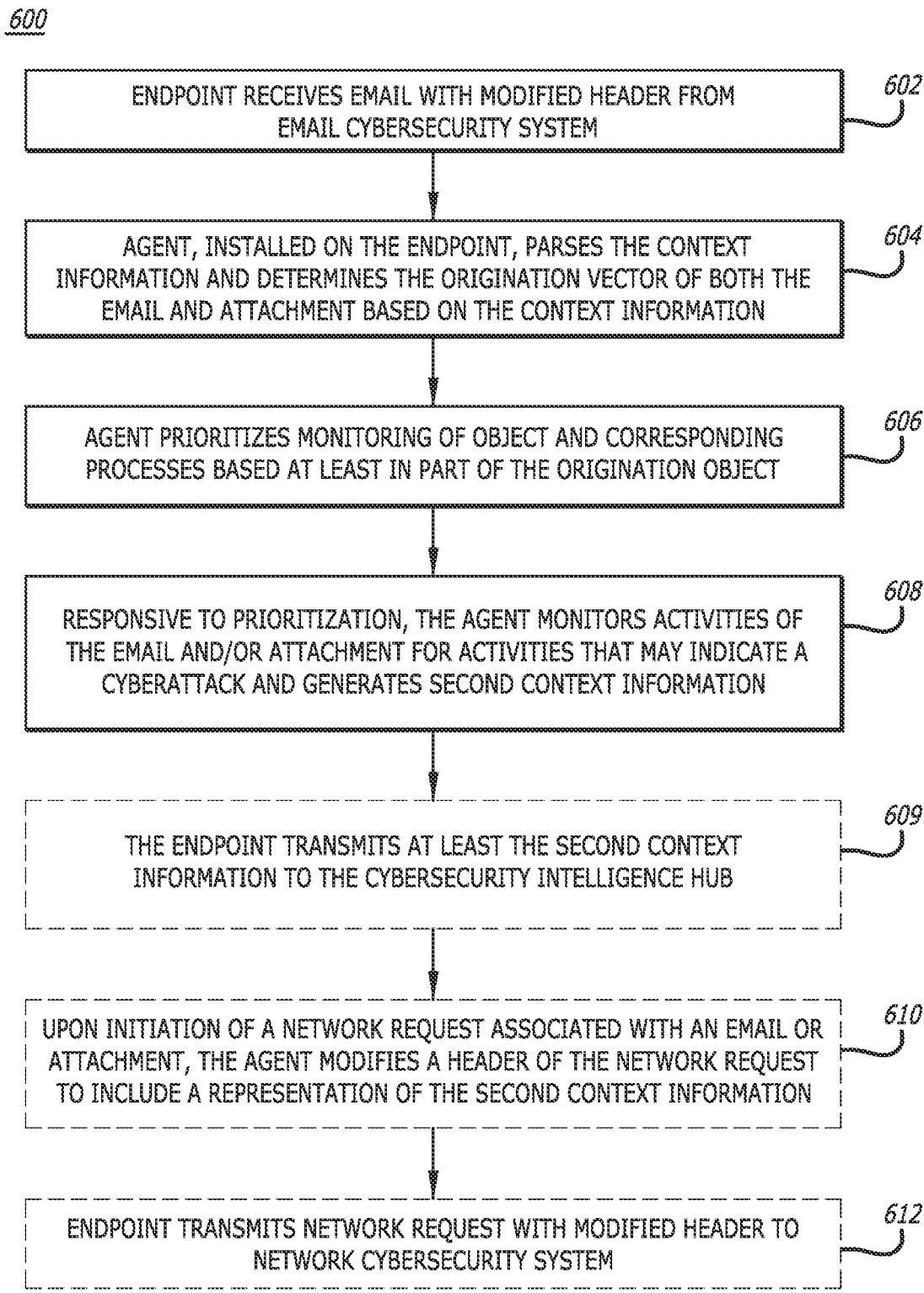
FIG. 6 is a flowchart illustrating a method of determining origination by an agent according to the context information of FIG. 5 and performing a malware analysis in light thereof.

Referring now to FIG. 6, with reference to FIG. 5, a flowchart illustrating a method of determining origination by an agent according to the context information of FIG. 5 and performing a malware analysis in light thereof is shown. Each block illustrated in FIG. 6 represents an operation performed in the method 600 of determining origination by an agent according to received context information and performing a malware analysis in light thereof. The method 600 begins when an endpoint having an agent installed thereon receives the email object from the email cybersecurity system described in FIG. 5 having a modified header that includes context information generated by the email cybersecurity system (block 602).

In response to receipt of the email object having a modified header, the agent obtains the context information from the modified header and parses the context information to determine the origination of the email object (block 604). Additionally, as discussed above with respect to FIG. 4, the email object may include one or more attachments, that may each include embedded objects. The agent determines the origination of each object based on the context information. As a vast number of processes and objects operate on an endpoint concurrently at any given time, the origination of each object is important in prioritizing the monitoring or analysis of objects or processes.

Following the determination of the origination of each object included within the email object (e.g., such as an attachment or an embedded object), the agent prioritizes the monitoring and analysis, and optionally, the classification phase, of the object based at least in part on the origination of the object as discussed above (block 606). Based on the prioritization monitoring and analysis, the agent monitors activities of the object (and associated objects) for indicators of compromise (IoCs) that may indicate an association with malware or a cyberattack (block 608). In addition, the agent generates second context information based on the monitoring and analysis performed by the agent. In particular, the monitoring and analysis may include detection of certain behaviors or operations, that based on the application of one or more rule sets, may indicate that a behavior or operation has a high likelihood of being an IoC. Optionally, the endpoint may transmit at least the second context information to the cybersecurity hub and/or the management system (block 609).

In some instances during processing, an object or process may initiate a network request, e.g., a request to access a website or retrieve social media content via an application installed on the endpoint. Upon the initiation of a network request associated with the email object (e.g., or any object included therein) such as activation of a URL, the agent modifies the header of the network request to include at least a representation of the context information generated by the agent (block 610). In one embodiment, modification of the header of the network request may compromise including an additional network header, for example, as described above. Following modification of the header of the network request, the endpoint transmits the network request to a network cybersecurity system (block 612).

Figure 7:
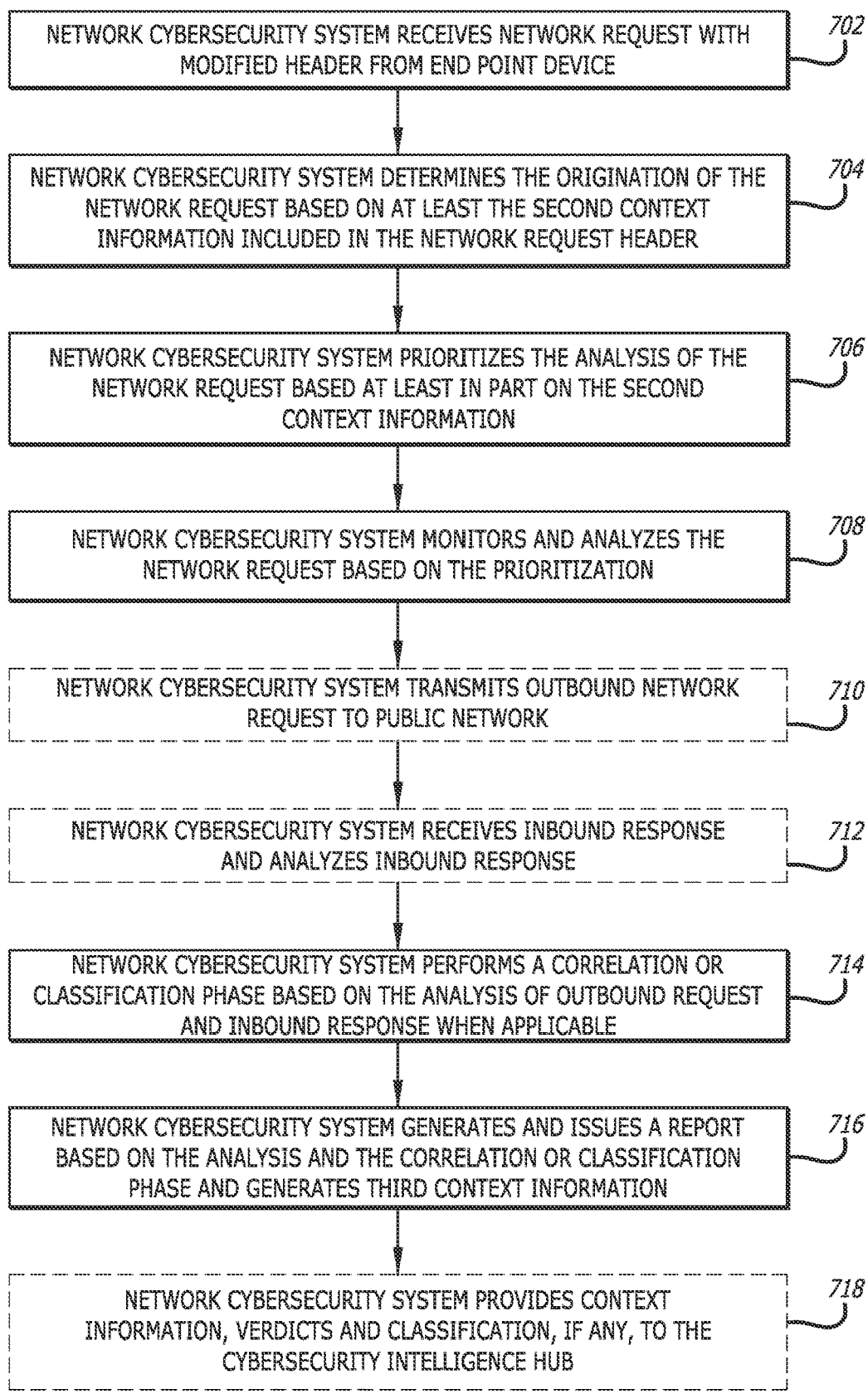
FIG. 7 is a flowchart illustrating a method of determining origination by a network cybersecurity system according to the context information of FIG. 6 and performing a malware analysis in light thereof.

Referring now to FIG. 7, with reference to FIGS. 5-6, a flowchart illustrating a method of determining origination by a network cybersecurity system according to the context information of FIG. 6 and performing a malware analysis in light thereof is shown. Each block illustrated in FIG. 7 represents an operation performed in the method 700 of determining origination by a network cybersecurity system according to received context information and performing a malware analysis in light thereof. The method 700 begins when a network cybersecurity system receives a network request from the endpoint described in FIG. 6, the network request having a modified header that includes context information generated by the agent (block 702).

Upon receiving the network request, the network cybersecurity system determines the origination of the network request based on the context information included in the modified header (block 704). With respect to network requests, context information may include information tracing the path of the network request through the malware analysis data sharing system as well as the origination of the initiating object. As one example, the context information of a network request may include an indication that the processing of an attachment of an email resulted in the initiation of the network request such that the origination is via email.

Based at least in part on the context information generated by the agent, the network cybersecurity system prioritizes the analysis of the network request, which may be performed by the scheduler 828 as illustrated in FIG. 8. The network cybersecurity system prioritizes an analysis of the network request, which may be based on the origination of the network request (e.g., origination may indicate a likelihood of association with malware above a suspiciousness threshold but below a maliciousness threshold) according to a set of predetermined prioritization rules and/or a configuration rules (e.g., containing threshold parameter values) of the network cybersecurity system (block 706).

Upon prioritizing the analysis of the network request, the network cybersecurity system analyzes the network request (or a copy thereof, depending on the deployment) from the endpoint according to the prioritized, e.g., tailored, analysis (block 708). When the network request is not found to be malicious (or in some situations, even when found to be malicious, in order to examine a response), the network cybersecurity system transmits the outbound network request to a public network, i.e., the internet (optional block 710). The network cybersecurity system may receive an inbound response, associate the inbound response with the outbound network request and analyze the inbound response based at least in part on the context information corresponding to the network request and generated by the agent (optional block 712). For example, in some embodiments, the inbound response may include identifying information enabling the network cybersecurity system to pair the inbound response with the outbound network request, and, thus utilize at least the context information corresponding to the network request in analyzing the inbound response.

Following the analysis of the network request (and optionally of the inbound response when applicable), the network cybersecurity system performs a correlation or classification phase in which at least the results of the analysis are utilized by the network cybersecurity system to classify the network request (e.g., suspicious, malicious, benign, or indeterminate) (block 714). In some embodiments, context information from prior analyses of the object that initiated the network request, including any classification verdicts, may be utilized in the classification phase of the network cybersecurity system. Upon completion of the correlation or classification phase, the network cybersecurity system generates third context information and issues a report based on the results of the analysis and the correlation or classification phase (block 716). Additionally, optionally, the network cybersecurity system may transmit at least the third context information to the cybersecurity hub and/or the management system (718). It should be understood that each cybersecurity system discussed in the disclosure may perform a correlation or classification phase upon completing a malware analysis.

Referring now to FIG. 8, an exemplary embodiment of a logical representation of an appliance cybersecurity system is shown. The appliance cybersecurity system 800, in an embodiment, may be a network device that includes a housing, which may be made entirely or partially of a hardened material (e.g., hardened plastic, metal, glass, composite or any combination thereof) that protects the circuitry within the housing, namely one or more processors 802 that are coupled to a network interface 804 and an administration interface 806, for receiving updates, for example. The network interface(s) 804, in combination with a network interface logic 838, enables communications with external network devices and/or other network appliances to receive objects, such as object 842 as well as other data, e.g., context information corresponding to object 842 when not included in a modified header. According to one embodiment of the disclosure, the network interface 804 may be implemented as a physical interface including one or more ports for wired connectors. Additionally, or in the alternative, the interwork interface 804 may be implemented with one or more radio units for supporting wireless communications with other electronic devices. The network interface logic 838 may include logic for performing operations of receiving and transmitting one or more objects via the network interface 804, such as the object 842.

The cybersecurity system appliance 800 may also include a persistent storage 808 that is communicatively coupled to the processors 802 and stores one or more executable software components configured to monitor behaviors and characteristics of the object 842. Specifically, the persistent storage 808 may include the following logic as software modules: a header logic 820, a (pre-and-post) traffic analysis logic 812, a rules engine 814, a header encoder/decoder logic 816, a rules store 818, a detection engine 820 including a static analysis engine 822, a dynamic analysis engine 824 and a suspiciousness determination logic 826, a scheduler 828 including prioritization logic 830 and a detection engine configurator 832, a classification logic 834, a reporting logic 836, a network interface logic 838 and a retroactive detection logic 840.

Numerous operations of the software modules, upon execution by the processor(s) 802, are described above and below. However, in some detail, the traffic analysis logic 812 is configured to perform pre- and post-analysis of communications, which may include parsing the communications (incoming or outgoing) and extracting the headers. For incoming communications, the traffic analysis logic 812 extracts the header, e.g., of object 842, and transmit the header to the header logic 810 which parses the header for the context information (the header logic 810 then passes the context information to the scheduler 828). For outgoing communications, e.g., a network request (not shown) detected during processing of the object 842 in the dynamic analysis engine 824, the traffic analysis logic 812 receives notice of such network request from the detection engine 820 and provides information to the header logic 810 to ensure that context information is added to the header of the network request. Additionally, a header encoder/decoder logic 816 is configured to (i) decode a header including context information upon receipt of an object, and (ii) encode a header with context information prior to transmission of an object. More specifically, the header encoder/decoder logic 816 receives an encoded header from the header logic 810 and decodes the header, e.g., decodes a X-header of a received email to enable the header logic 810 to parse the header for context information. In addition, the header encoder/decoder logic 816 receives a header of an object that has been modified by the header logic 810 and encodes the header prior to transmission of the object.

The static analysis engine 822 is configured to perform a static phase, during which network traffic is examined (without execution), for example, for signature-based matches against a library of known malware, and/or for communication-based protocol anomalies or other characteristics upon which a cybersecurity classification may be based. The dynamic analysis engine 824 is configured to perform a dynamic phase, during which a virtual machine deployed within the cybersecurity system executes objects obtained from the network traffic and monitors the behaviors of each object during execution where information regarding each monitored behavior may also be referred to as an "event" and may be used in cybersecurity classification of the object.

The suspiciousness determination logic 826 is configured as an intermediary logic engine between the static analysis engine 822 and the dynamic analysis engine 824 that modifies the scoring and weighting used by the static analysis engine 822 in determining suspiciousness or maliciousness of the object 824. The suspiciousness determination logic 826 may perform a series of operations. First, the suspiciousness determination logic 826 assigns one or more weights or scores to each of the observed characteristics of the static analysis in accordance with a set of rules (e.g., a default set of static analysis rules). Second, the suspiciousness determination logic 826 compares a combined score or weight of the observed characteristics against a first threshold, e.g., established by a second rule set, e.g., different than the static analysis rules. As a third operation, when the combined score is greater than or equal to the first threshold, the suspiciousness determination logic 826 passes the object 842 to the dynamic analysis engine 824. However, is some embodiments, the object 842 may be passed to the dynamic analysis engine 824 regardless of whether the combined score is greater than or equal to the first threshold. As a fourth operation, upon receiving a score or weight from the dynamic analysis engine 824, the suspiciousness determination logic 826 combines the dynamic analysis score or weight with the scores or weights of the static analysis and compares the total combined score or weight against a second threshold, which may be the same as or different than the first threshold before providing the results to the classification logic when the second threshold is met or exceeded. In some embodiments, the suspiciousness determination logic 826 may implement additional iterations of either the static analysis and/or the dynamic analysis, with the same or different rules utilized therein.

Further, the dynamic analysis engine 824 may modify the first and second thresholds based on the context information corresponding to the object 842. In addition, the dynamic analysis engine 824 may apply additional weighting to the weights or scores of either the static analysis and/or the dynamic analysis results. For example, the suspiciousness determination logic 826 receives the context information (or alternatively instructions from the scheduler 828) and determines a modification of the scoring and weighting used by the static analysis engine 822. Thus, the context information may influence the verdict of the static analysis of the object 842, which may determine whether the object 842 is processed by the dynamic analysis engine 824 (i.e., the scoring and weighting may be modified based on the origination of the object 842).

The prioritization logic 830, included within the scheduler 828, may be configured to utilize received context information to modify (i) the rule sets utilized by the detection engine 820 in the analysis of the object 842, (ii) the correlation rules used by the classification logic 834, (iii) the thresholds used by the classification logic 834, (iv) a time duration for processing the object 842 with the dynamic analysis engine 824, and/or (v) the scoring and weighting used by the classification logic 834. In addition, the detection engine configurator 832 may coordinate performance of a deeper static analysis and/or an augmented static analysis via a remote cybersecurity system based on the context information (and the results of the static analysis in some embodiments).

The detection engine configurator 832, which is present in network cybersecurity systems, may be configured to (i) schedule when the object 842 is to be processed and analyzed in light of the context information, (ii) determine that the object 842 will be processed with a specific guest image within a virtual machine due to the context information indicating one or more particular applications should be running in the dynamic analysis environment, and/or (iii) determine the object 842 will be monitored according to a specific instrumentation package (i.e., a set of process monitors) based on the context information. Of course, it is contemplated that some or all of this logic may be implemented as hardware, and if so, such logic could be implemented separately from each other.

Referring now to FIG. 9, an exemplary embodiment of a logical representation of an endpoint including an agent cybersecurity system is shown. The endpoint 900 has physical hardware including hardware processors 902, network interface(s) 904, a persistent storage 912, a system interconnect 910, and optionally, a user interface 908. The persistent storage 912 may contain software comprising an operating system (OS) 914, one or more applications 916 and an agent 918. The physical hardware (e.g. hardware processors 902, network interfaces(s) 904, persistent storage 912) may be connected for communication by the system interconnect 910, such as a bus. Generally speaking, the endpoint 900 is a network-connected electronic device, such as a general purpose personal computer, laptop, smart phone, tablet or specialized device such as point of sale (POS) terminal and server.

The hardware processor 902 is a multipurpose, programmable device that accepts digital data as input, processes the input data according to instructions stored in its memory, and provides results as output. One example of the hardware processor 902 is an Intel® microprocessor with its associated instruction set architecture, which is used as a central processing unit (CPU) of the endpoint 900. Alternatively, the hardware processor 902 may include another type of CPU, a digital signal processor (DSP), an application specific integrated circuit (ASIC), or the like.

The network device(s) 906 may include various input/output (I/O) or peripheral devices, such as a storage device, for example. One type of storage device may include a solid state drive (SSD) embodied as a flash storage device or other non-volatile, solid-state electronic device (e.g., drives based on storage class memory components). Another type of storage device may include a hard disk drive (HDD). Each network device 906 may include one or more network ports containing the mechanical, electrical and/or signaling circuitry needed to connect the endpoint 900 to a private network to thereby facilitate communications over a system network. To that end, the network interface(s) 904 may be configured to transmit and/or receive messages using a variety of communication protocols including, inter alia, TCP/IP and HTTPS.

The persistent storage 912 may include a plurality of locations that are addressable by the hardware processor 902 and the network interface(s) 904 for storing software (including software applications) and data structures associated with such software. The hardware processor 902 is adapted to manipulate the stored data structures as well as execute the stored software, which includes an operating system (OS) 914, one or more applications 916 and the agent 918.

The operating system (OS) 914 is software that manages hardware, software resources, and provides common services for computer programs, such as applications 916. For hardware functions such as input and output (I/O) and memory allocation, the operating system 914 acts as an intermediary between applications 916 and the computer hardware, although the application code is usually executed directly by the hardware and frequently makes system calls to an OS function or be interrupted by it.

The agent 918 is comprised of one or more executable software components configured to monitor activities of the applications 916 and/or operating system 914. Specifically, the agent 918 may be comprised of the following logic as software modules: one or more process monitors 902, a header logic 922, interprocess interface logic 924, header encoder/decoder logic 926, classification logic 928, reporting logic 930, detection engine 932, detection engine configurator 934, rules store 936, and retroactive detection logic 938.

Numerous operations of the software modules, upon execution by the processor(s) 902, are described above. However, in some detail, the one or more process monitors 902 are configured to monitor the processing activity that is occurring on the endpoint 900. In particular, rules, stored in the rules stored 936 are used to assist the agent 918 in activities that are to be monitored, as well as in detection and classification of the activities. The rules store 936 is also configured to store prioritization rules, classification rules, etc., as discussed above. The rules store 936 may be, periodically or aperiodically, updated to reflect additional rule sets, remove obsolete rules, etc. In some embodiments, the agent 918 may perform classification via the classification logic 928, e.g., using correlation rules stored in the rules store 936. In other embodiments, the agent 918 may monitor activities and log certain activities to be reported to a separate network device such as a threat management system or a SIEMs for correlation and classification.

The header logic 922 is configured to parse a header of a received object (i.e., the object 905), such as an email or a network request. As discussed above, in the case of an email object, the header logic 922 parses the email header for a X-header including context information. In addition, as discussed above, upon generating context information, the header logic 922 may modify the header of the object 905 to include the generated context information prior to the endpoint 900 transmitting the object 905 to another cybersecurity system and/or another endpoint. Additionally, when a second object, e.g., a network request associated with the object 905, is to be transmitted to a network cybersecurity system, the header logic 922 modifies the header of the network request to include context information generated according to the analysis of the object 905 by the agent 918. In the case of a network request, the header logic 922 modifies a HTTP header and/or adds a network header in order to include the context information.

The interprocess interface logic 924 is configured to enable interaction and cooperation between the agent 918 and processes that are running on the endpoint 900 to enable the agent 918 to receive information when events occur (e.g., when the endpoint 900 receives an email). The header encoder/decoder logic 926 is configured to (i) decode a header including context information upon receipt of an object, and (ii) encode a header with context information prior to transmission of an object. More specifically, the header encoder/decoder logic 926 receives an encoded header from the header logic 922 and decodes the header, e.g., decodes a X-header of a received email to enable the header logic 922 to parse the header for context information. In addition, the header encoder/decoder logic 926 receives a header of an object that has been modified by the header logic 922 and encodes the header prior to transmission of the object.

The detection engine 932, in the agent 900, activates process monitors for the analysis of the object 905 and detects specific activities that may indicate a likelihood of an association with a cyberattack. The classification logic 928 is configured to perform a classification phase, using correlation rules, in which the results of the analysis by the agent 918 are utilized to classify the object 905 (e.g., suspicious, malicious, benign, or indeterminate).

The detection engine configurator 934 is configured to determine one or more rule sets to be employed by the detection engine 932 and the classification logic 928. As discussed above, the prioritization of an agent's monitoring and analysis may result in a tailoring of the typical rule sets used by the agent based on the context information corresponding to the object 905 by the endpoint 900. The reporting logic 930 may be configured to generate and issue (or cause the endpoint 900, STEM or an endpoint threat management system with which it communicates to issue) a report.

The retroactive detection logic 938 may be optionally included in the agent 918 or may alternatively be included in a threat management system. The retroactive detection logic 938 is configured to facilitate remediation of an affected device (e.g., endpoint 900). The retroactive detection logic 938 may utilize context information to trace the path through which a malicious object traveled within the enterprise network. By determining the path through which the malicious object traveled, the retroactive detection logic 938 can initiate remediation efforts on any affected network device (e.g., quarantine the device on the network and/or the object within the device). Of course, it is contemplated that some or all of this logic may be implemented as hardware, and if so, such logic could be implemented separately from each other.

In the foregoing description, the invention is described with reference to specific exemplary embodiments thereof. It will, however, be evident that various modifications and changes may be made thereto without departing from the broader spirit and scope of the invention as set forth in the appended claims. For example, in lieu of the use of rules-based cybersecurity systems, as described above, model based cybersecurity systems may be deployed in which models are used to conduct the malware analysis in lieu of a rule set as identified throughout portions of the specification. While rules are applied in series to incoming data to produce a result, for models, the entire model is applied to incoming data and a result is produced therefrom. This disclosure discusses the use of rules for purposes of clarity; however, the disclosure is not intended to be so limiting as any analysis control scheme may be utilized.

What is claimed is:

1. A computerized method for analyzing an object within an enterprise network, the method comprising:

obtaining, by a cybersecurity system, an object and first context information generated during a first malware analysis of the object conducted prior to obtaining the object; and performing, by the cybersecurity system, a second malware analysis of the object to determine a verdict indicating maliciousness of the object, wherein a scrutiny of the second malware analysis is adjusted based at least in part by (i) activating additional or different monitors, (ii) adjusting thresholds for determining maliciousness, or (iii) applying a modified rule set during the second malware analysis based on the first context information, wherein the second malware analysis is based at least in part on an origination of the object, the origination being a vector by which the object entered the enterprise network, and wherein the origination is determined by parsing the first context information for origination information associated with the origination of the object.

2. The computerized method of claim 1, wherein prior to performing the second malware analysis, modifying a set of predetermined rules associated with the second malware analysis based at least in part on the first context information to produce the modified rule set.

3. The computerized method of claim 1, wherein prior to performing the second malware analysis, activating the additional or different monitors by at least activating a particular set of process monitors based at least in part on the first context information.

4. The computerized method of claim 1 further comprising:

performing the first malware analysis of the object by a first cybersecurity system being a first network device, wherein the first malware analysis produces the first context information that includes at least the origination information of the object corresponding to a manner by which the object entered the enterprise network and additional information detailing performance of the first malware analysis.

5. The computerized method of claim 1, wherein the first context information further includes a result of the first malware analysis, a hash of the object and one or more rules implicated during the first malware analysis.

6. The computerized method of claim 1, wherein the object is a modified object including the first context information.

7. The computerized method of claim 6, wherein the modified object is an email including a modified header of the email including the first context information, the modified object being provided to an agent on an endpoint conducting the second malware analysis of the modified object.

8. The computerized method of claim 4 further comprising:
uploading, by the first cybersecurity system, the first context information to a storage device communicatively coupled to the enterprise network; and
obtaining, by the second cybersecurity system, the first context information by causing a query to be transmitted to the storage device.

9. The computerized method of claim 1, wherein the vector corresponds to information identifying a manner in which the object entered into the enterprise network.

10. The computerized method of claim 1, wherein the performing of the second malware analysis is conducted based, at least in part, on an origination and object type of the object.

11. The computerized method of claim 9, wherein the vector includes a mode of entry into the enterprise network including (i) email traffic, (ii) network traffic, or (iii) a removable storage device.

12. A non-transitory storage medium including software that, when executed, by a processor performs operations including analyzing an object within an enterprise network, comprising:
obtaining, by the processor, an object and first context information generated during a first malware analysis of the object conducted prior to obtaining the object; and
performing, by the processor, a second malware analysis of the object to determine a verdict indicating maliciousness of the object, wherein a scrutiny of the second malware analysis is adjusted based at least in part by (i) activating additional or different monitors, (ii) adjusting thresholds for determining maliciousness, or (iii) applying a modified rule set during the second malware analysis based on the first context information,
wherein the second malware analysis is based at least in part on an origination of the object, the origination being a vector by which the object entered the enterprise network, and wherein the origination is determined by parsing the first context information for origination information associated with the origination of the object.

13. The non-transitory storage medium of claim 12, wherein the software, prior to performing the second malware analysis, conducts an operation of modifying a set of predetermined rules associated with the second malware analysis based at least in part on the first context information to produce the modified rule set.

14. The non-transitory storage medium of claim 12, wherein the software, prior to performing the second malware analysis, conducts an operation of activating the additional or different monitors by at least activating a particular set of process monitors based at least in part on the first context information.

15. The non-transitory storage medium of claim 12, wherein the software, upon execution by the processor, further obtains additional information detailing performance of the first malware analysis along with the origination information.

16. The non-transitory storage medium of claim 12, wherein the first context information further includes a result of the first malware analysis, a hash of the object, and one or more rules implicated during the first malware analysis.

17. The non-transitory storage medium of claim 12, wherein the obtained object is a modified object including the first context information.

18. The non-transitory storage medium of claim 17, wherein the modified object is an email including a modified header of the email including the first context information, the modified object being provided to an agent on an endpoint conducting the second malware analysis of the modified object.

19. The non-transitory storage medium of claim 12, wherein the vector corresponds to information identifying a manner in which the object entered into the enterprise network.

* * * * *